US008640972B2

(12) United States Patent
Otto et al.

(10) Patent No.: US 8,640,972 B2
(45) Date of Patent: Feb. 4, 2014

(54) SPRAYER HAVING SPRAY SOLUTION AGITATION SYSTEM

(75) Inventors: Todd A. Otto, Jordan, MN (US); Brannon W. Polk, Evansville, IN (US); David J. Norlander, Cottage Grove, MN (US); Robert J. Bisson, Savage, MN (US); Bruce A. Granger, Prior Lake, MN (US); John H. Weber, Prior Lake, MN (US)

(73) Assignee: The Toro Company, Bloomington, MN (US)

( * ) Notice: Subject to any disclaimer, the term of this patent is extended or adjusted under 35 U.S.C. 154(b) by 67 days.

(21) Appl. No.: 13/113,057

(22) Filed: May 22, 2011

(65) Prior Publication Data

US 2012/0292402 A1   Nov. 22, 2012

(51) Int. Cl.
*B05B 9/00* (2006.01)
(52) U.S. Cl.
USPC ............................................ 239/127; 239/172
(58) Field of Classification Search
USPC .................. 239/127, 124, 172, 159, 147, 600
See application file for complete search history.

(56) References Cited

U.S. PATENT DOCUMENTS

| 3,463,397 | A | * | 8/1969 | Mecklin et al. | 239/126 |
| 3,491,949 | A | * | 1/1970 | Hairston | 239/127 |
| 4,714,196 | A | * | 12/1987 | McEachern et al. | 239/62 |
| 4,723,710 | A | * | 2/1988 | Lucore, II | 239/124 |
| 6,053,426 | A | * | 4/2000 | Robinson et al. | 239/127 |
| 7,124,961 | B2 | * | 10/2006 | Wilting | 239/124 |

* cited by examiner

*Primary Examiner* — Davis Hwu
(74) *Attorney, Agent, or Firm* — James W. Miller

(57) ABSTRACT

A sprayer has a tank for holding a spray solution that is applied to a ground or turf surface. The sprayer includes an agitation system having a plurality of agitation nozzles that extend into the tank that are accessible from outside the tank and can be removed and replaced without using tools. The sprayer may include a rinse system carried onboard the sprayer which is segregated from the spray and agitation systems to avoid contaminating the rinse liquid prior to the time the rinse liquid is sprayed into the tank through rinse nozzles. The rinse nozzles include upwardly and downwardly directed nozzle ports and a bottom spinner for thoroughly cleaning all interior surfaces of the tank. The sprayer may also include a chemical eductor mounted on the side of the tank, whose weight is counterbalanced by springs, and which easily pivots between lower and upper positions on the tank.

8 Claims, 20 Drawing Sheets

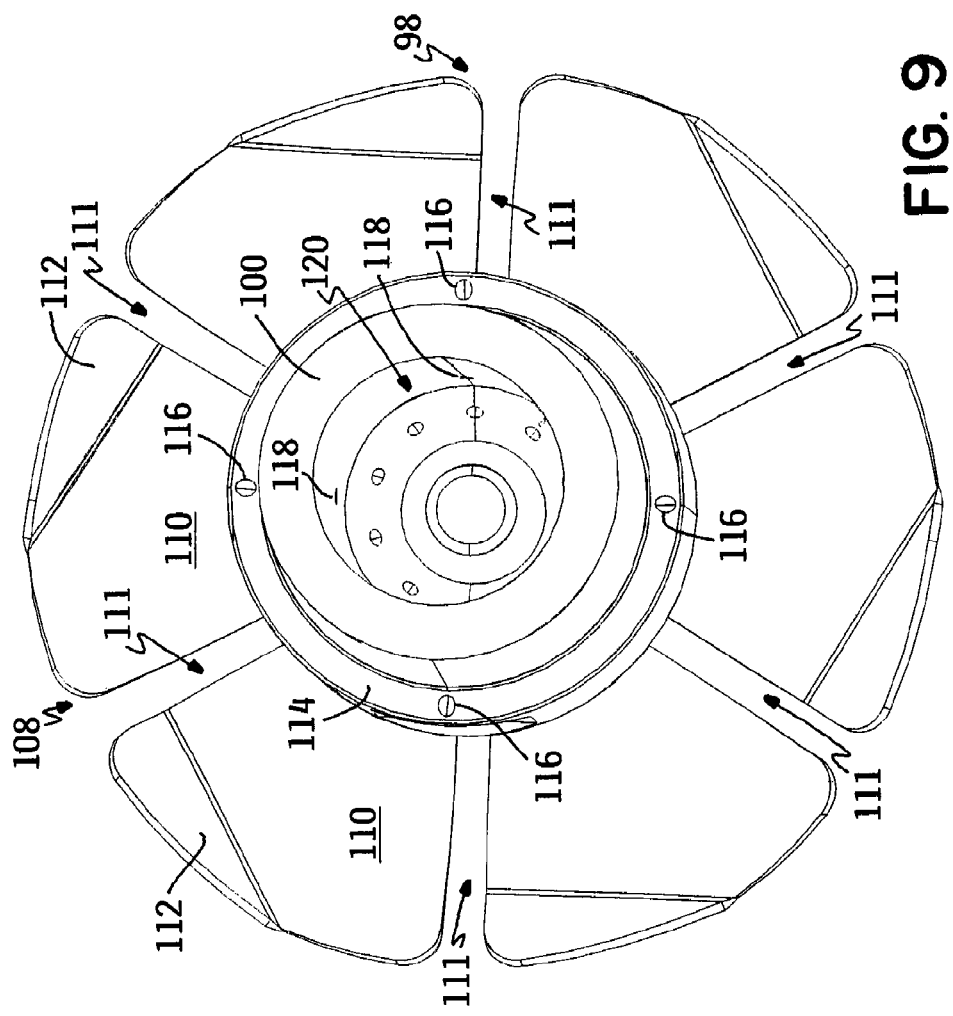
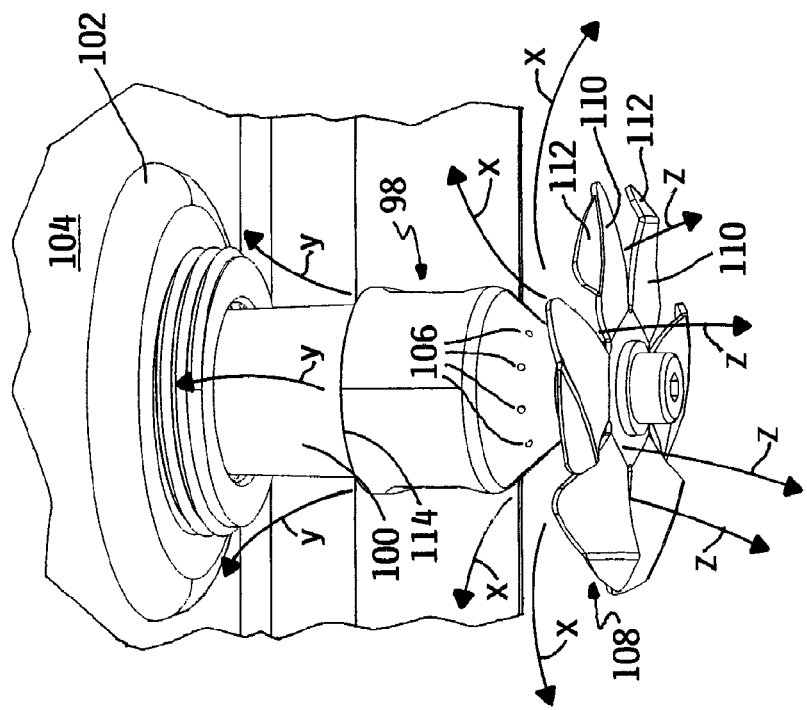
FIG. 9
FIG. 8

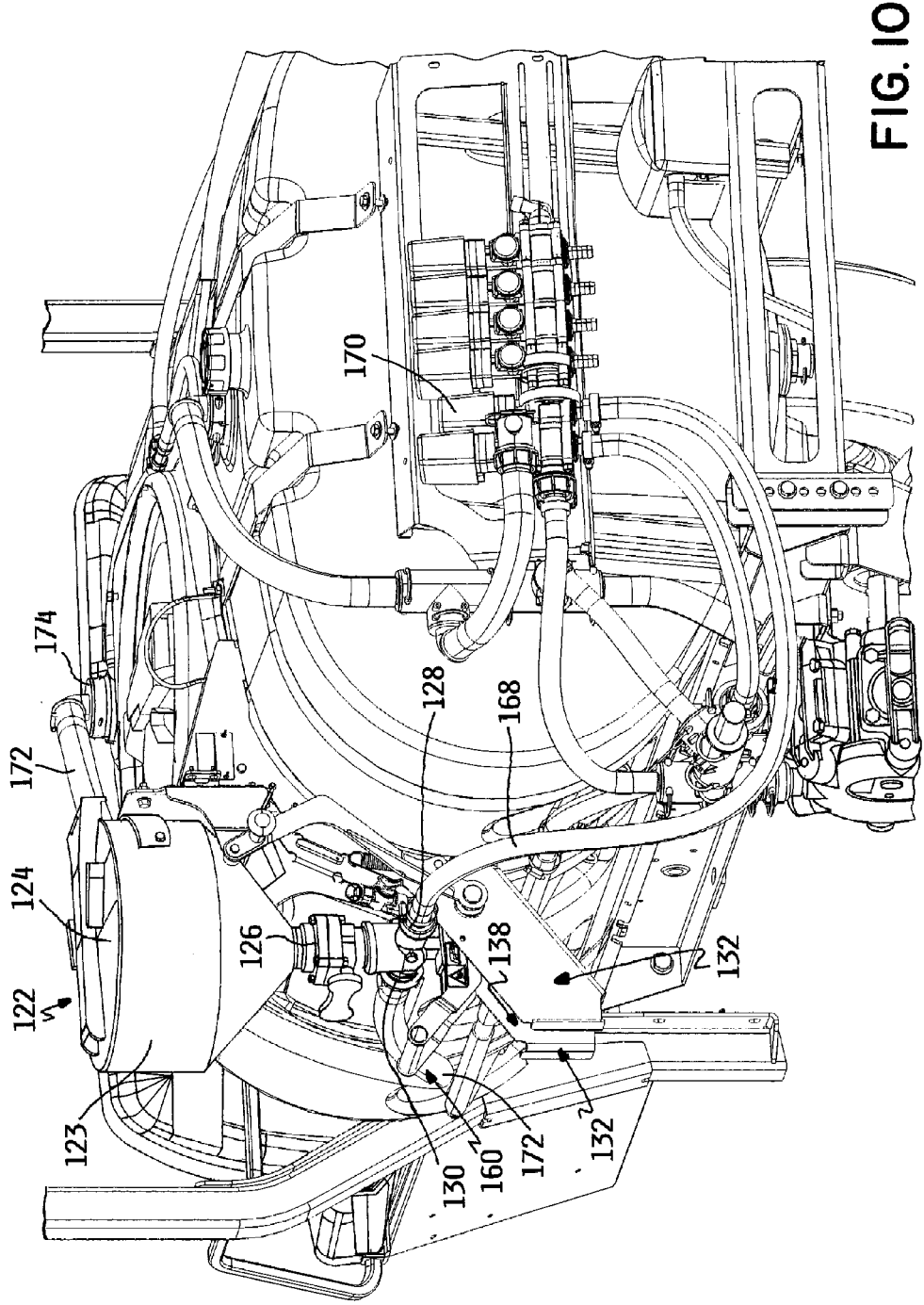

SPRAYER HAVING SPRAY SOLUTION AGITATION SYSTEM

TECHNICAL FIELD

This invention relates to vehicle propelled sprayers that travel over a ground or turf surface for spraying a liquid spray solution onto such a surface as the sprayer passes over the surface.

BACKGROUND OF THE INVENTION

Sprayers are well known devices for applying a liquid spray solution of some type to a ground or turf surface. Such sprayers are typically carried on or propelled by a vehicle to allow the sprayer to be driven over a large area of the surface in a relatively short time. In order to further enhance productivity, such sprayers typically have a plurality of side-by-side, laterally extending spray booms that cover a spray swath that is larger than the width of the wheelbase of the sprayer. The outboard wing booms of such a sprayer can usually be folded inwardly to reduce the width of the sprayer for transport when the sprayer is being transported from place to place and is not being used for spraying. U.S. Pat. No. 7,364,096 to Sosnowski et al, which is owned by The Toro Company, the assignee of this invention, discloses a sprayer of this type having a fixed center boom and a pair of wing booms that can be folded into an X-shaped configuration above the center boom for transport.

Sprayers of the type under consideration here include a relatively large tank for holding a supply of the spray solution that is to be applied to the ground or turf surface. The spray solution comprises a relatively small amount of a chemical that is mixed with and suspended in solution in a relatively large amount of water in a desired ratio. One problem is ensuring that the chemical in the spray solution remains in solution with the water as it is stored in the tank prior to being sprayed. While various tank agitation systems are known in the sprayer art for attempting to solve this problem, such systems typically employ agitation nozzles that the Applicants have discovered are improperly positioned for solving the problem and which are difficult to access and/or remove for nozzle cleaning, maintenance or replacement. Accordingly, a more effective agitation system with easily removable agitation nozzles would be a desirable advance in the art.

Another difficulty posed with sprayers of this type is the need to clean the tank that holds the spray solution and the related plumbing in the spray and agitation systems of the sprayer at the conclusion of a spraying operation. Usually, the sprayer must be driven to some source of clean water, a hose must be connected to a spigot on the clean water source, the operator must climb atop the tank and remove the tank lid, and the operator then uses the hose to introduce a quantity of clean water into the tank. In doing so, the operator has to try and wash down or rinse all the interior surfaces of the tank in an attempt to remove residual chemicals. This can be difficult if not impossible to do as some of the interior surfaces may be awkwardly or inaccessibly positioned relative to the operator, thereby discouraging or preventing the operator from reaching them. In addition, such a manual operation exposes the operator to the residual chemicals in the tank.

Once the tank has been rinsed in this manner, the usual tank agitation and spray systems are operated in a flushing operation to cause the rinsate, i.e. the newly introduced clean water and residual chemical mixture, to pass through the agitation and spray systems and out through the spray nozzles on the spray boom. It may be that the water spigot used to introduce the clean water into the tank is not located at a place where the flushing operation of the rinsate may take place. For example, the clean water spigot might be located at a maintenance facility or the like where the rinsate will drain into a storm sewer system carrying the rinsate into a lake or river and environmental regulations would prohibit this. In this example, the sprayer must be returned to a location where the rinsate can be safely and legally sprayed before the flushing operation takes place. This often involves returning the sprayer to the ground or turf surface on which the sprayer was originally located as it is often acceptable to spray the rinsate onto this surface since this surface was able to accept the undiluted spray solution in the first place.

In order to completely clean the tank, it is necessary that the above-noted rinsate flushing procedure be repeated at least a few times. Driving the sprayer to the water source, manually rinsing the tank down, driving the sprayer back to a location where the flushing operation can take place, and doing this a number of times, is obviously time consuming and inconvenient. Accordingly, it would be a further advance in the art to have a simpler and more efficient rinse system for cleaning the spray solution holding tank on the sprayer without requiring undue effort on the part of the operator and without exposing the operator to residual chemicals in the tank.

The introduction of the chemicals into the tank used to hold the spray solution and the mixing of the chemicals with the water in the tank in order to form the spray solution is a further problem with such sprayers. Chemical eductors are known devices which more conveniently provide such mixing. Such eductors include relatively small hoppers that are mounted to the side of the tank. The chemicals used in the spray solution, whether in liquid or dry form, are poured directly into the hopper rather than into the tank itself.

In order to allow the operator to fill the hopper of the eductor with the chemicals, the eductor is desirably positioned at a height which can be easily reached by an operator standing on the ground. However, an eductor that is permanently mounted to the tank in this position inherently sticks out laterally to one side of the sprayer beyond the lateral wheelbase of the vehicle that carries the sprayer. This requires that the driver of the vehicle be careful to avoid banging or hitting the eductor against an obstacle that might damage the eductor or rip the eductor off the vehicle. Accordingly, it would be desirable to be able to also store the eductor in a more protected storage and transport position but to be able to quickly and easily move the eductor between its various positions.

SUMMARY OF THE INVENTION

One aspect of this invention relates to a sprayer for applying a liquid spray solution to a ground or turf surface. The sprayer comprises a frame that is movable over the ground or turf surface. A tank is carried by the frame for holding the liquid spray solution. The tank has a substantially elliptical lateral cross section that can be subdivided into a pair of upper quadrants and a pair of lower quadrants by an xy coordinate system that is centered on a longitudinal centerline of the tank. A spray system is carried by the frame for withdrawing the liquid spray solution from the tank and for spraying the liquid spray solution downwardly onto the ground or turf surface through a plurality of downwardly facing spray nozzles. An agitation system is also carried by the frame for withdrawing the liquid spray solution from the tank and for recirculating the liquid spray solution back into the tank for keeping the liquid spray solution in solution. The agitation system comprises a plurality of agitation nozzles that are mounted on one side of the tank, that are spaced apart along a length of the tank, and that are oriented to direct the spray solution inwardly into the tank. The agitation nozzles are located within one of the lower quadrants of the tank lateral cross section.

Another aspect of this invention relates to a sprayer for applying a liquid spray solution to a ground or turf surface. The sprayer comprises a frame that is movable over the ground or turf surface. A spray solution tank is carried by the frame for holding the liquid spray solution. A spray system is carried by the frame for withdrawing the liquid spray solution from the tank and for spraying the liquid spray solution downwardly onto the ground or turf surface through a plurality of downwardly facing spray nozzles. The spray system includes a spray pump. A rinse system is carried by the frame for rinsing the spray solution tank and the spray system with a rinse liquid after spraying operations are concluded. The rinse system comprises a rinse tank holding a rinse liquid and a rinse pump that is separate from the spray pump for withdrawing rinse liquid from the rinse tank and for spraying the rinse liquid into the spray solution tank through at least one rinse nozzle provided inside the spray solution tank. The rinse system is isolated from the spray system such that the rinse liquid does not contact any portion of the spray system that has previously been in contact with the spray solution until after the rinse liquid is sprayed into the spray solution tank through the rinse nozzle with the rinse liquid sprayed into the spray solution tank then being withdrawn from the spray solution tank through operation of the spray system.

Yet another aspect of this invention relates to a sprayer for applying a liquid spray solution to a ground or turf surface. The sprayer comprises a frame that is movable over the ground or turf surface. The frame is supported by a plurality of ground engaging wheels that define a lateral wheelbase. A spray solution tank is carried by the frame for holding the liquid spray solution. A spray system is carried by the frame for withdrawing the liquid spray solution from the tank and for spraying the liquid spray solution downwardly onto the ground or turf surface through a plurality of downwardly facing spray nozzles. An eductor system is carried by the frame for mixing a chemical with water to form the spray solution. The eductor system comprises an eductor pivotally attached by a mount to one side of the spray solution tank for pivotal motion between an upper storage or transport position and a lower fill and operational position. The eductor in the upper storage or transport position lies within the lateral wheelbase of the frame of the sprayer.

BRIEF DESCRIPTION OF THE DRAWINGS

This invention will be described more completely in the following Detailed Description, when taken in conjunction with the following drawings, in which like reference numerals refer to like elements throughout.

FIG. 8 is an enlarged perspective view of one of the rinse nozzles of the rinse system of the sprayer of FIG. 1;

FIG. 9 is an enlarged perspective from above of the rinse nozzle shown in FIG. 8, particularly illustrating in part the upper nozzle ports that rinse that portion of the ceiling of the holding tank located substantially immediately above the rinse nozzle;

FIG. 10 is a rear perspective view similar to FIG. 4 of the sprayer of FIG. 1, particularly illustrating a chemical eductor having been mounted on the side of the spray solution holding tank as well as the eductor valve and its associated plumbing;

DETAILED DESCRIPTION

Figure 1:
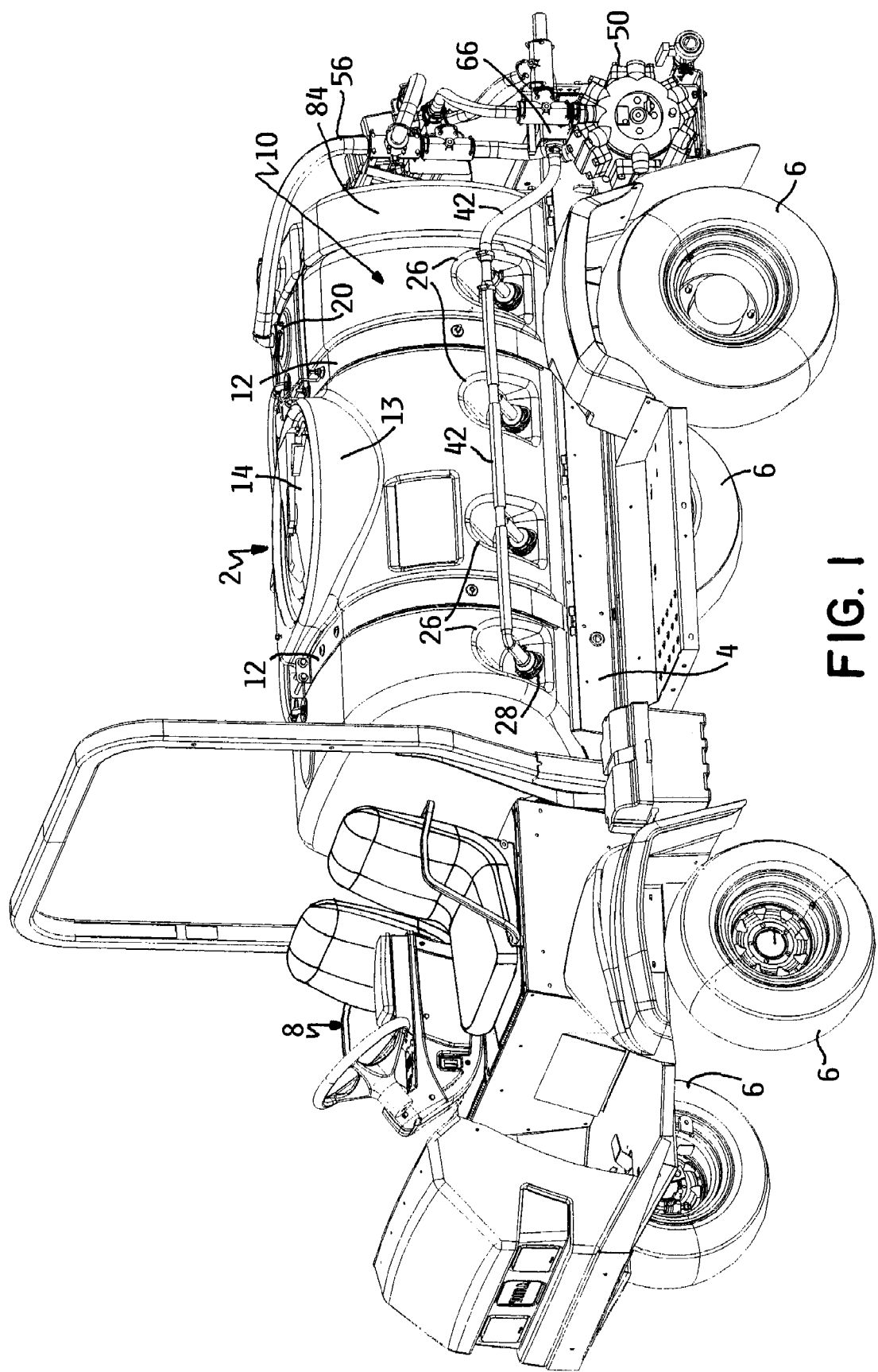
FIG. 1 is a perspective view of one embodiment of a sprayer according to this invention, particularly illustrating the sprayer as being carried on a movable frame provided by a vehicle for traversing over a ground or turf surface with the spray booms that are carried at the rear of the sprayer having been omitted in FIG. 1 for the purpose of clarity.

Referring first to FIG. 1, one embodiment of a sprayer according to this invention is illustrated as 2. Sprayer 2 comprises a mobile frame 4 that is supported for rolling over the ground by a plurality of ground engaging wheels 6. In the case of sprayer 2 shown in FIG. 1, frame 4 comprises the frame of a self-propelled vehicle, such as a utility vehicle 8 of the type manufactured and sold by The Toro Company, the assignee of this invention, under the Workman® brand name. However, other vehicles could be used in place of utility vehicle 8 for carrying sprayer 2. Sprayer 2 could also be mounted on its own wheeled frame and simply be towed or pushed by a separate self-propelled vehicle.

Sprayer 2 comprises one or more spray booms (not shown) behind frame 4 having a plurality of downwardly pointing spray nozzles for spraying a spray solution downwardly onto a ground or turf surface over which sprayer 2 is travelling. Preferably, three spray booms are provided comprising a center boom and two wing booms that are pivotally attached to opposite ends of the center boom. When the three spray booms are disposed in an operative, spray position, the booms are placed end-to-end relative to one another and extend laterally behind frame 4 with the collective length of the booms being substantially wider than the lateral wheelbase of frame 4. The spray booms can also be disposed in a non-operative, storage or transport position in which the wing booms are placed in an X-shaped orientation above the center boom.

Such a set of spray booms is disclosed in U.S. Pat. No. 7,364,096, which is owned by The Toro Company, the assignee of this invention. U.S. Pat. No. 7,364,096 is hereby incorporated by reference to more particularly disclose the details of such booms. However, the number, nature, dimensions and structure of the spray booms are not important to this invention as long as there is at least one spray boom with spray nozzles that face downwardly towards the ground or turf surface in a spray position of the boom. Thus, the spray booms have not been illustrated in FIGS. 1-16 for the sake of clarity, though they are diagrammatically shown in the schematic views of FIGS. 17-19.

The Spray and Agitation Systems

Sprayer 2 has a spray and agitation system that includes a tank 10 for holding a relatively large volume of a liquid spray solution (e.g. a chemical or chemicals, such as a fertilizer, herbicide, pesticide or the like, mixed with water). Tank 10 is secured to frame 4 by a plurality of straps 12 that encircle tank 10 at spaced locations along its length to secure or clamp tank 10 to frame 4. Tank 10 is preferably molded from a relatively rigid, durable plastic material. Tank 10 has a relatively large capacity, e.g. 300 gallons.

Tank 10 has a relatively large circular fill opening 13 in the top thereof which is normally closed by a lid 14. When lid 14 is manually opened or removed by a user, the user has access to the inside of tank 10 for filling tank 10 with the water and chemicals used to form the spray solution. Alternatively and as will be described later, a chemical eductor 122 could be mounted on one side of tank 10 for allowing the mixing of the chemicals and the water to be done at a location outside tank 10 using eductor 122. In this alternative, the chemicals themselves are not directly introduced into tank 10 but are introduced into eductor 122. Accordingly, in the alternative that uses eductor 122, fill opening 13 on tank 10 would be used only for introducing water into tank 10.

Figure 3:
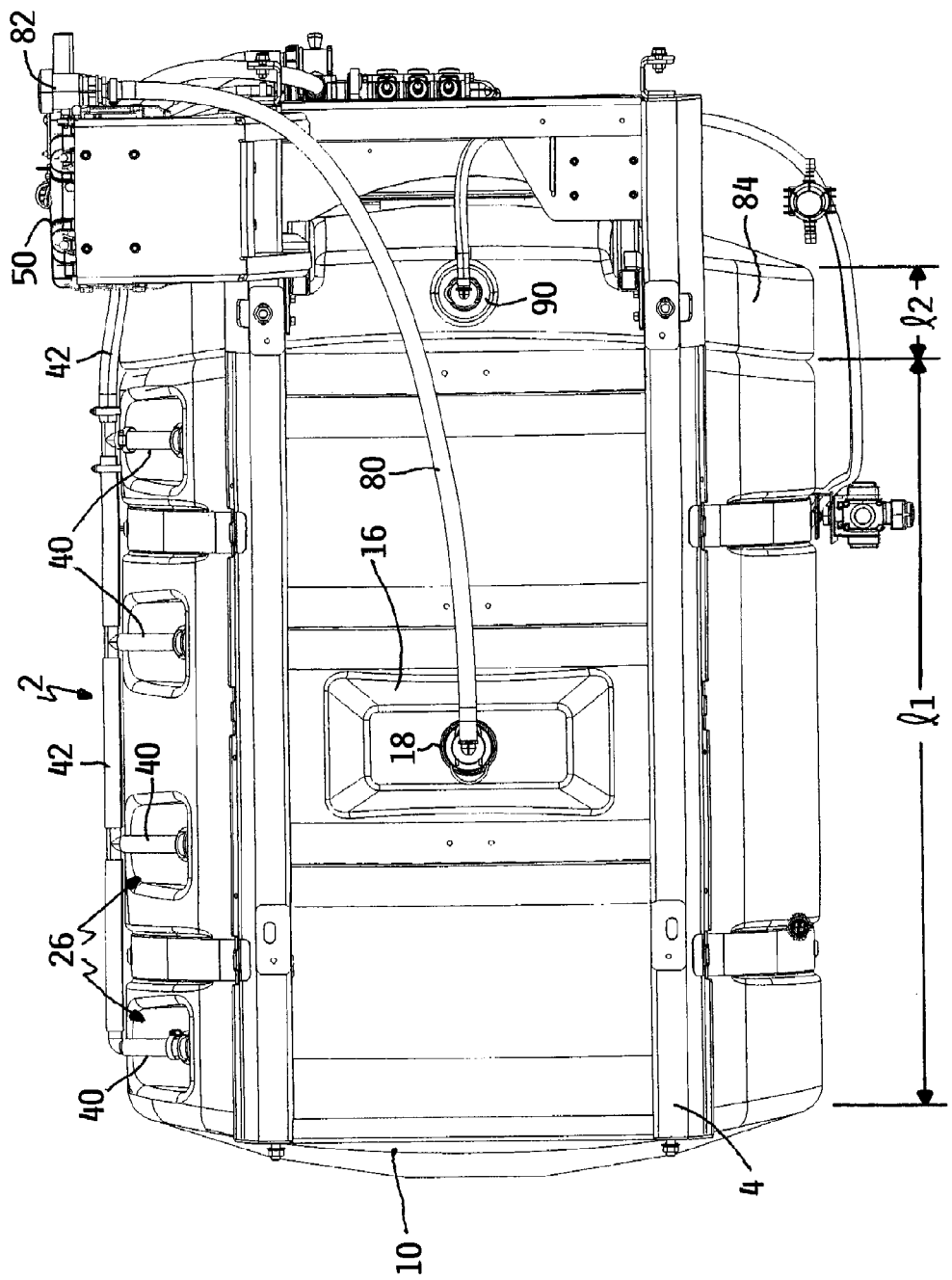
FIG. 3 is a bottom plan view of the sprayer of FIG. 1.
Figure 5:
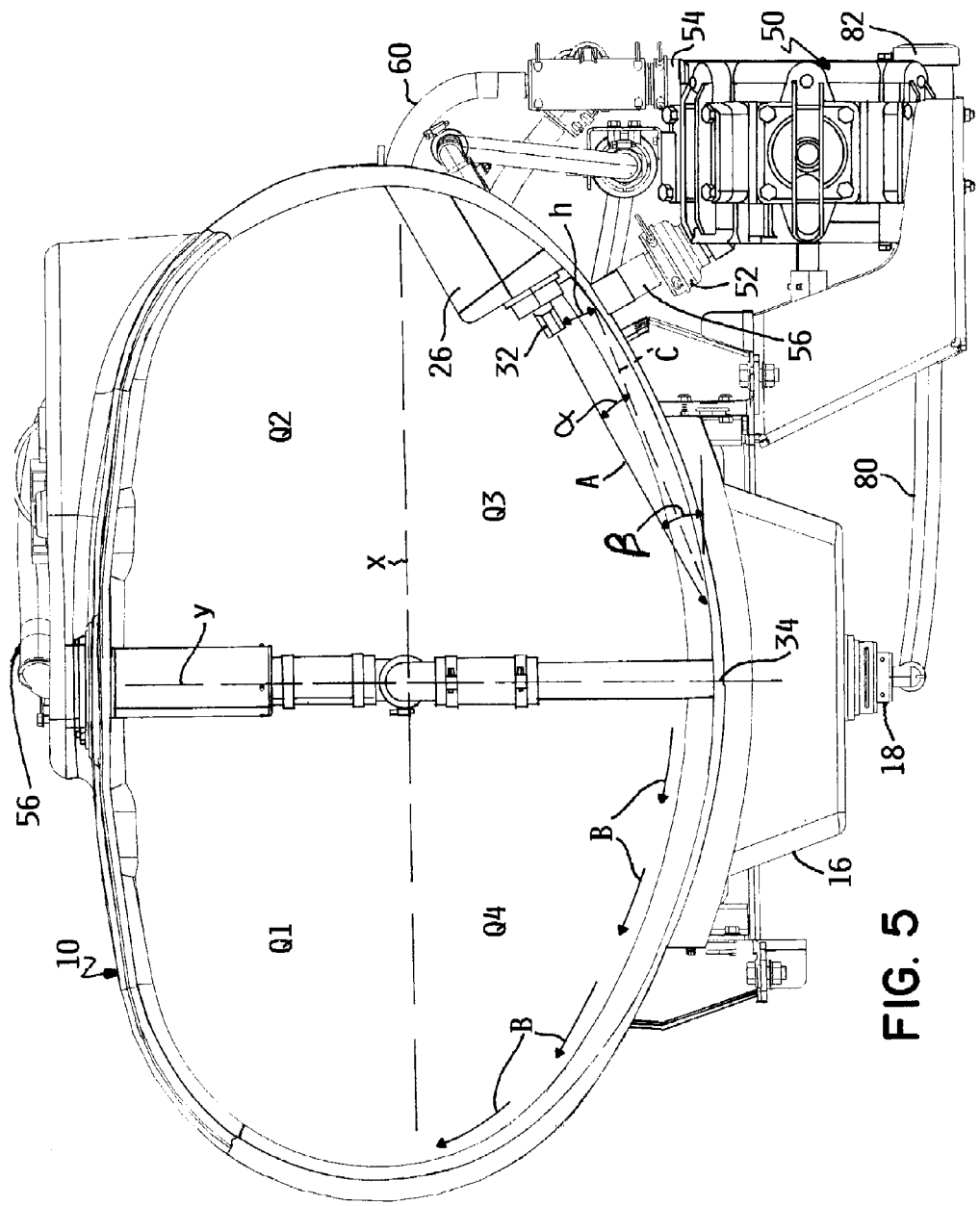
FIG. 5 is a lateral cross-sectional view through the spray solution holding tank of the sprayer of FIG. 1, particularly illustrating the orientation of the agitation nozzles relative to the lateral cross-sectional shape of the holding tank.

Referring to FIGS. 3 and 5, the bottom of tank 10 has a downwardly extending sump 16. A drain opening 18 is located at the bottom of sump 16 for draining residual spray solution from tank 10.

Figure 2:
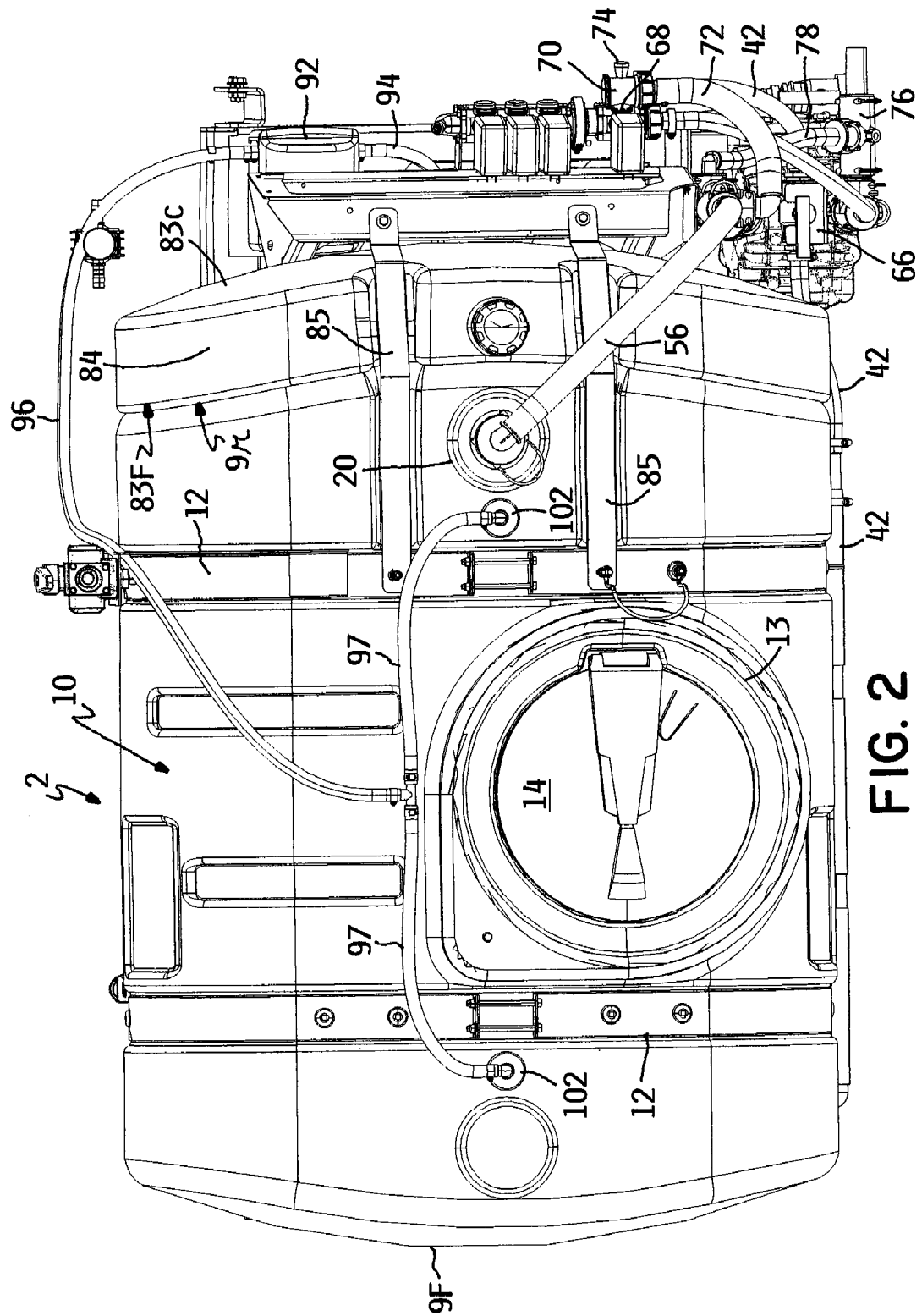
FIG. 2 is a top plan view of the sprayer of FIG. 1.
Figure 4:
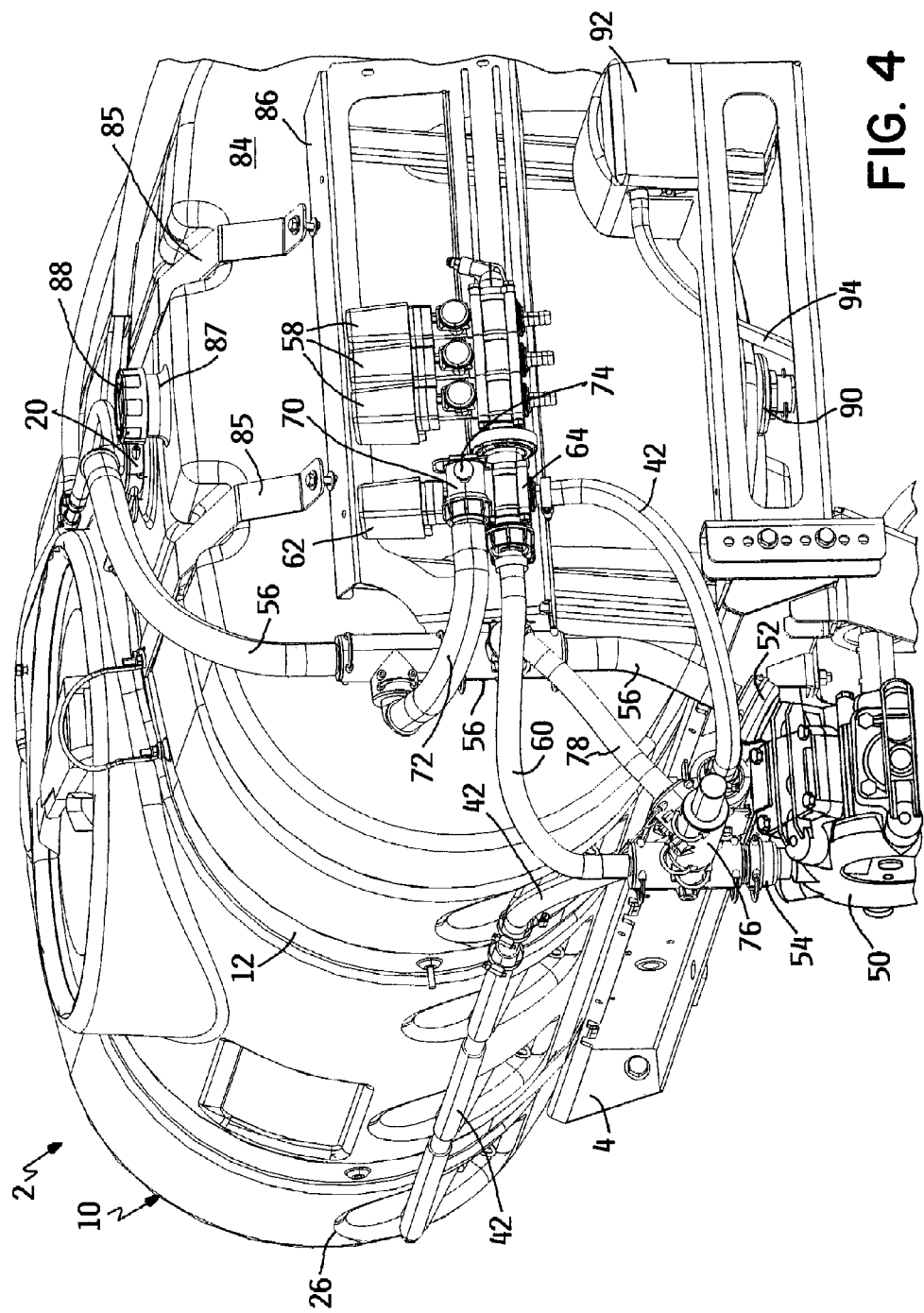
FIG. 4 is a rear perspective view of the sprayer of FIG. 1, particularly illustrating the pump that is used for both spraying and agitation of the spray solution, the three grouped spray valves that control the flow of the spray solution from the pump to the spray nozzles carried on the spray booms, the agitation valve that directs pump flow through the agitation nozzles carried on the spray solution holding tank, and various hose and plumbing connections therefor.
Figure 6:
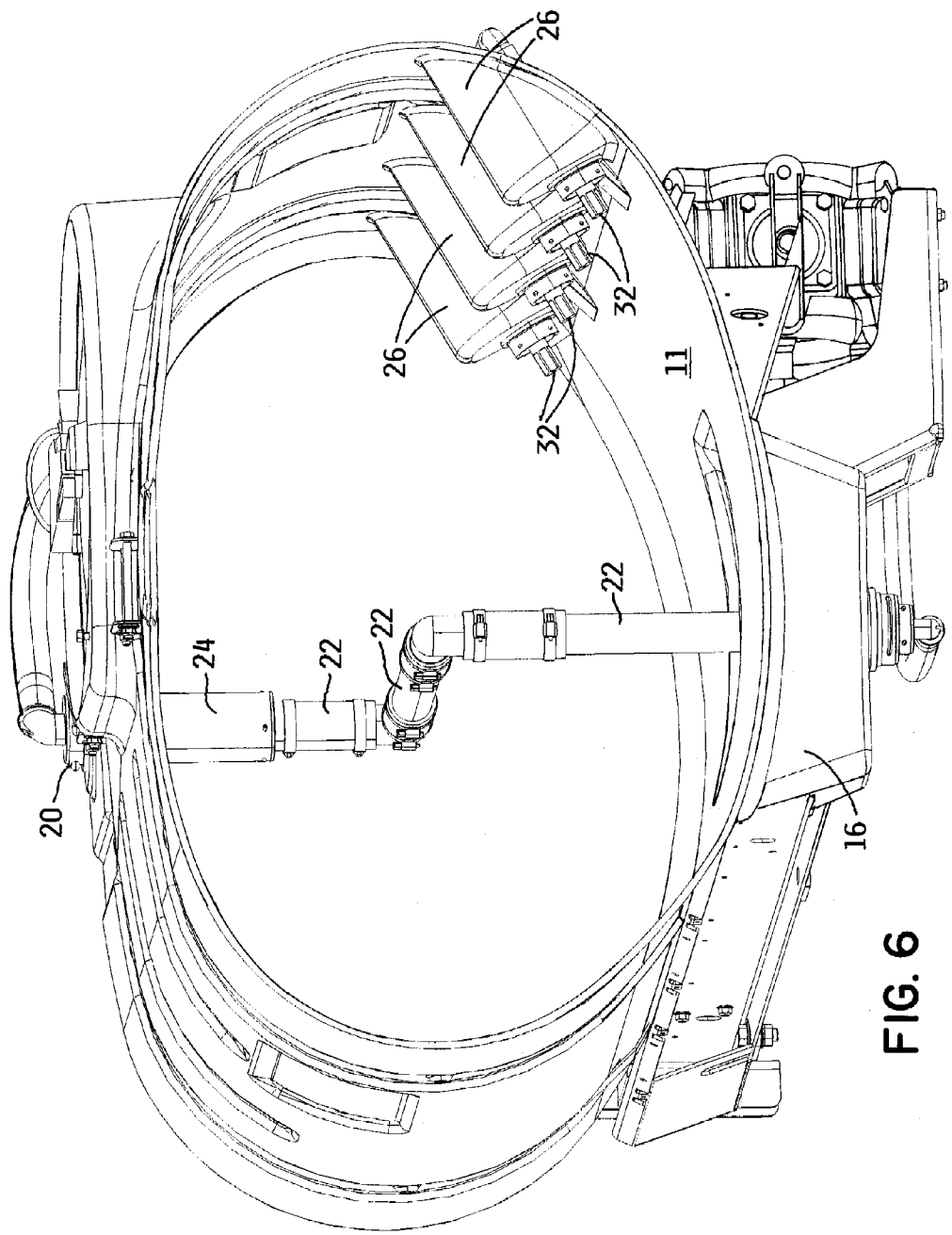
FIG. 6 is a perspective view of the front of the spray solution holding tank of the sprayer of FIG. 1, particularly illustrating the holding tank with a portion of the front wall thereof broken away to illustrate the line of agitation nozzles carried on one side of the holding tank as well as the suction tube assembly that draws spray solution out of a sump located in the bottom of the tank.

As best shown in FIGS. 2, 4 and 6, an outlet 20 is provided in the top of tank 10 for drawing the spray solution out of tank 10. In order to accomplish this, a suction tube assembly 22 extends downwardly from tank outlet 20 with the lower end of suction tube assembly 22 extending down into sump 16 to be located closely adjacent to but spaced above the bottom of sump 16. See FIG. 6. When suction is applied to suction tube assembly 22 as will be described later, the spray solution in tank 10 will be drawn upwardly from sump 16 through suction tube assembly 22 to be ejected out through tank outlet 20 in the top of tank 10. A spray solution filter 24 for straining out contaminants or debris in the spray solution is preferably interposed between the top end of suction tube assembly 22 and tank outlet 20.

Figure 7:
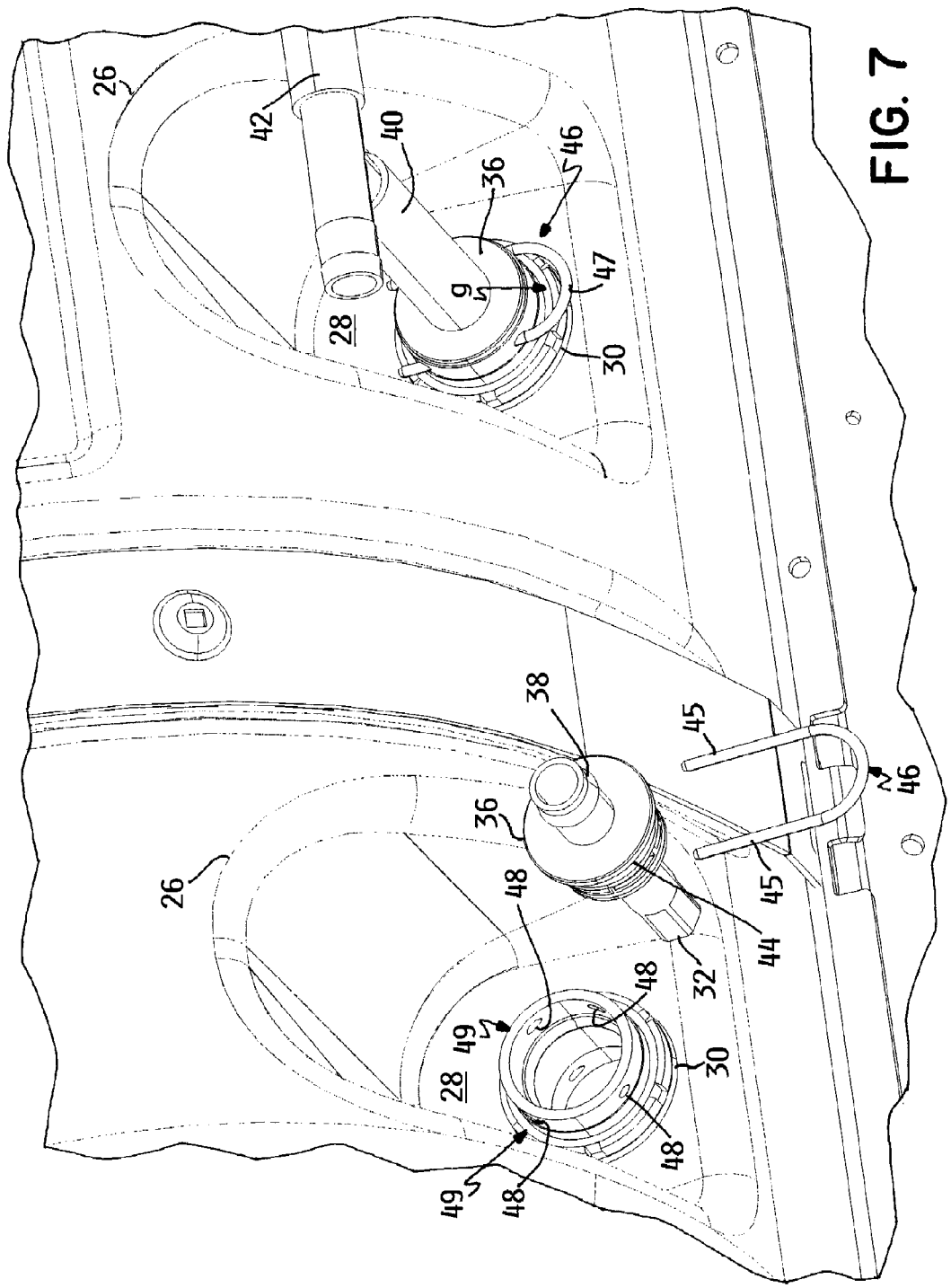
FIG. 7 is a perspective view of the outside of a portion of the spray solution holding tank of the sprayer of FIG. 1, particularly illustrating some of the agitation nozzles with one of the nozzles being shown in exploded form to show how the nozzles are releasably held in place on the holding tank and are accessible from outside the holding tank.

A very noticeable characteristic of tank 10 is a plurality (i.e. four) of inwardly extending, downwardly angled pockets 26 placed fairly low along one side of tank 10. See FIG. 1. Each pocket 26 takes away a small portion of the interior volume that would otherwise be provided by tank 10 as each pocket 26 extends inwardly into that volume. As best shown in FIG. 7, each pocket 26 ends in an upwardly and outwardly facing inclined floor 28 that contains a fitting 30 for receiving one agitation nozzle 32. Agitation nozzles 32 are easily accessible from outside tank 10 by virtue of their being mounted within pockets 26 formed in tank 10.

As best shown in FIG. 5, tank 10 has a cross-sectional shape that is substantially elliptical in shape in its lateral cross-section. When an xy coordinate system is superimposed onto the lateral cross-section of tank 10 with the center of the xy coordinate system being aligned with a fore-and-aft extending, horizontal centerline of tank 10, the xy coordinate system divides the lateral cross-section of tank 10, and thus divides the volume of tank 10, into a pair of upper quadrants $Q_1$ and $Q_2$ and a pair of lower quadrants $Q_3$ and $Q_4$, all as shown in FIG. 5.

When agitation nozzles 32 are mounted in pockets 26 therefor, each agitation nozzle 32 is substantially identically positioned relative to tank floor 11 of tank 10 as shown in FIG. 6. As shown in FIG. 5, the height h of each agitation nozzle 32 above that portion of tank floor 11 over which it is mounted measured from the bottom of agitation nozzle 32 and perpendicularly to the axis of agitation nozzle 32 is only approximately 2 inches. In addition, agitation nozzles 32 are spaced apart along the length of tank 10 such that the intervals or distances between agitation nozzles 32 are substantially the same.

Each agitation nozzle 32 ejects liquid therefrom through a single nozzle outlet forming a substantially concentrated jet of liquid in the direction of the arrow A as depicted in FIG. 5. Each agitation nozzle 32 is designed to eject approximately 5 gallons per minute at 40 psi so that all four nozzles 32 eject 20 gallons per minute at 40 psi. Collectively, agitation nozzles 32 are sized to prevent changes in system pressure whether agitation is on or off. The direction A of nozzle ejection forms a small acute angle α of less than 15°, and preferably approximately 10°, relative to a chord C located on the arc of a portion of tank floor 11 with the chord C spanning from a spot on tank floor 11 that is radially in line with the outlet of agitation nozzle 32 to a spot on tank floor 11 where the direction A of nozzle ejection intersects with tank floor 11. If the direction A of nozzle ejection were measured relative to a horizontal line rather than to chord C, it would form an acute angle β of less than 30° and preferably approximately 23°.

The spot of intersection of the direction A of nozzle ejection with tank floor 11 does not extend past or beyond a longitudinal midline 34 of tank 10 and is as much as six to eight inches or so short of midline 34 in a tank 10 whose lateral width measured at its widest part is approximately 50 inches. Thus, agitation nozzles 32 are all placed within one of the lower quadrants $Q_3$ or $Q_4$ of tank 10, are oriented fairly low in the lower quadrant in which they are mounted and point towards the other lower quadrant, and the jets of liquid being ejected by nozzles 32 are angled downwardly as shown by the direction A in FIG. 5 to intersect with tank floor 11 in the same lower quadrant in which nozzles 32 are installed. While nozzles 32 have been shown in FIG. 5 as being positioned in lower quadrant $Q_3$ with direction A intersecting tank floor 11 before reaching lower quadrant $Q_4$, this could be reversed if so desired by mounting agitation nozzles 32 on the other side of tank 10 in lower quadrant $Q_4$ pointing toward lower quadrant $Q_3$.

The Applicants have found that the placement of agitation nozzles 32 low within one of the lower quadrants of tank 10 coupled with the downwardly angled orientation of the direction A of the liquid ejection from agitation nozzles 32 and further coupled with the substantially elliptical shape of tank 10 promotes a rolling of the spray solution held in tank 10 as shown by the arrows B in FIG. 5. This rolling action B has been found by the Applicants to be an effective type of agitation and that keeps the spray solution held in tank 10 thoroughly mixed together to prevent the chemicals from coming out of solution.

Referring now to FIG. 7, the upper end of each agitation nozzle 32 is carried by and supported within an enlarged cylindrical nozzle mount 36. Nozzle mount 36 of agitation nozzle 32 has a barbed inlet 38 that is coupled to a short inlet hose 40. Each inlet hose 40 for each agitation nozzle 32 is in turn coupled to an agitation hose run 42 that extends fore-and-aft along one side of tank 10. Agitation hose run 42 is located towards the bottom of tank 10 at the level of pockets 26 such that agitation hose run 42 overlies and passes, in part, across pockets 26.

Note that the term "hose" as used herein is not intended to be limited to a flexible hose though it includes a flexible hose. The term "hose" as used herein is also intended to include rigid conduits or tubes that are able to carry liquids regardless of the shapes thereof or the materials used to form such conduits or tubes. The term "hose run" as used herein is not intended to be limited to a single hose though it includes a single hose. The term "hose run" as used herein also includes any number of hoses, joints (such as elbow or Tee joints), and connectors between the same (such as hose clamps) that collectively form a fluid passageway.

Referring further to FIG. 7, nozzle mount 36 of agitation nozzle 32 has an annular external slot 44 around its periphery which is designed to receive the parallel legs 45 of a U-shaped connector 46. Fitting 30 for each agitation nozzle 32 contained on floor 28 of pocket 26 has two sets 49 of aligned holes 48 (one set 49 on each side of fitting 30) which receive the spaced legs 45 of connector 46. When agitation nozzle 32 is in place in fitting 30, nozzle mount 36 is received in fitting 30 with slot 44 being aligned with the sets 49 of holes 48 in fitting 30. This permits legs 45 of U-shaped connector 46 to be slid through the sets 49 of holes 48 in fitting 30 with legs 45 of connector 46 passing through opposite sides of annular slot 44 in nozzle mount 36 to quickly and releasably couple nozzle mount 36 and agitation nozzle 32 held therein to pocket 26 of tank 10.

FIG. 7 illustrates one agitation nozzle 32 in an installed position. Note that the base 47 of connector 46 when installed is spaced away from fitting 30 by a gap g that permits the user to insert his or her hand into gap g for pulling U-shaped connector 46 away from fitting 30. Another agitation nozzle 32 is shown in FIG. 7 with the U-shaped connector 46 pulled out and with agitation nozzle 32 having been lifted up out of pocket 26.

The set up of agitation nozzles 32 described above is one that is extremely easy for the user to access for repair, cleaning or replacement of agitation nozzles 32. First, agitation nozzles 32 are mounted in the exposed pockets 26 contained in one side of tank 10. Thus, nozzles 32 are exposed to the user for easy removal or replacement without the user needing any access to the interior of tank 10. This in itself is advantageous. Secondly, the use of a slidable U-shaped connector 46 as disclosed herein releasably holds an agitation nozzle 32 in place in a pocket 26 without using fasteners, such as bolts or screws, that have to be removed and replaced using tools. All the user need do is to slide connector 46 out and lift agitation nozzle 32 up out of pocket 26. This further saves time and eases the maintenance tasks that might be needed on agitation nozzles 32.

Sprayer 2 also includes a six cylinder positive displacement diaphragm pump 50 for pumping spray solution out of tank 10 and for sending such spray solution out through the spray nozzles contained in the spray booms in a spray only mode of operation, or through agitation nozzles 32 in an agitation only mode of operation, or simultaneously through both the spray and agitation nozzles in a combined agitation/spray mode of operation. Spray pump 50 is driven in any suitable fashion from some type of power source. For example, the internal combustion engine of utility vehicle 8 can power a hydraulic pump that is used to supply pressurized hydraulic fluid to a hydraulic motor coupled to the drive shaft of spray pump 50. How spray pump 50 is driven is not important to this invention as long as it can be driven in some manner by a power source that is part of the vehicle or part of sprayer 2.

Referring now to FIGS. 4 and 5, spray pump 50 has a pump inlet 52 on a suction side thereof and a pump outlet 54 on a positive pressure side thereof. A pump supply hose run 56 connects pump inlet 52 to tank outlet 20 on tank 10. When spray pump 50 is in operation, the suction of spray pump 50 is what draws the spray solution up from sump 16 of tank 10, through suction tube assembly 22, through filter 24, and then out through tank outlet 20 on tank 10 and through pump supply hose run 56 into pump inlet 52. Spray pump 50 then takes this incoming spray solution and pumps it out at a relatively high pressure through pump outlet 54.

Referring further to FIG. 4, sprayer 2 includes a bank of control valves at the rear of sprayer 2 generally close to spray pump 50. These control valves include three in-line spray valves 58, one for each of the three spray booms. A spray hose run 60 extends from pump outlet 54 to spray valves 58. Spray valves 58 have barbed outlets on the bottoms thereof which are by hoses to the spray nozzles carried on the various spray booms. When spray valves 58 are open and spray pump 50 is in operation, the spray solution being pumped by spray pump 50 will pass through spray hose run 60, through spray valves 58, and then out through the spray nozzles on the spray booms.

An agitation valve 62 is interposed into spray hose run 60 between pump outlet 54 and spray valves 58 as shown in FIG. 4. Agitation valve 62 has a bottom outlet 64 that is connected to agitation hose run 42 that leads to agitation nozzles 32. When agitation is turned on by the user by manipulating a toggle type on-off switch (not shown), bottom outlet 64 of agitation valve 62 is opened to permit flow from spray pump 50 to enter agitation hose run 42 to pass into tank 10 through agitation nozzles 32 to keep the spray solution thoroughly mixed with the chemicals remaining in solution with the water. For such agitation to occur, agitation must be turned on by activating agitation valve 62 to open bottom outlet 64, the power source that powers spray pump 50 must be running above idle, and spray pump 50 must be operating.

Figure 17A:
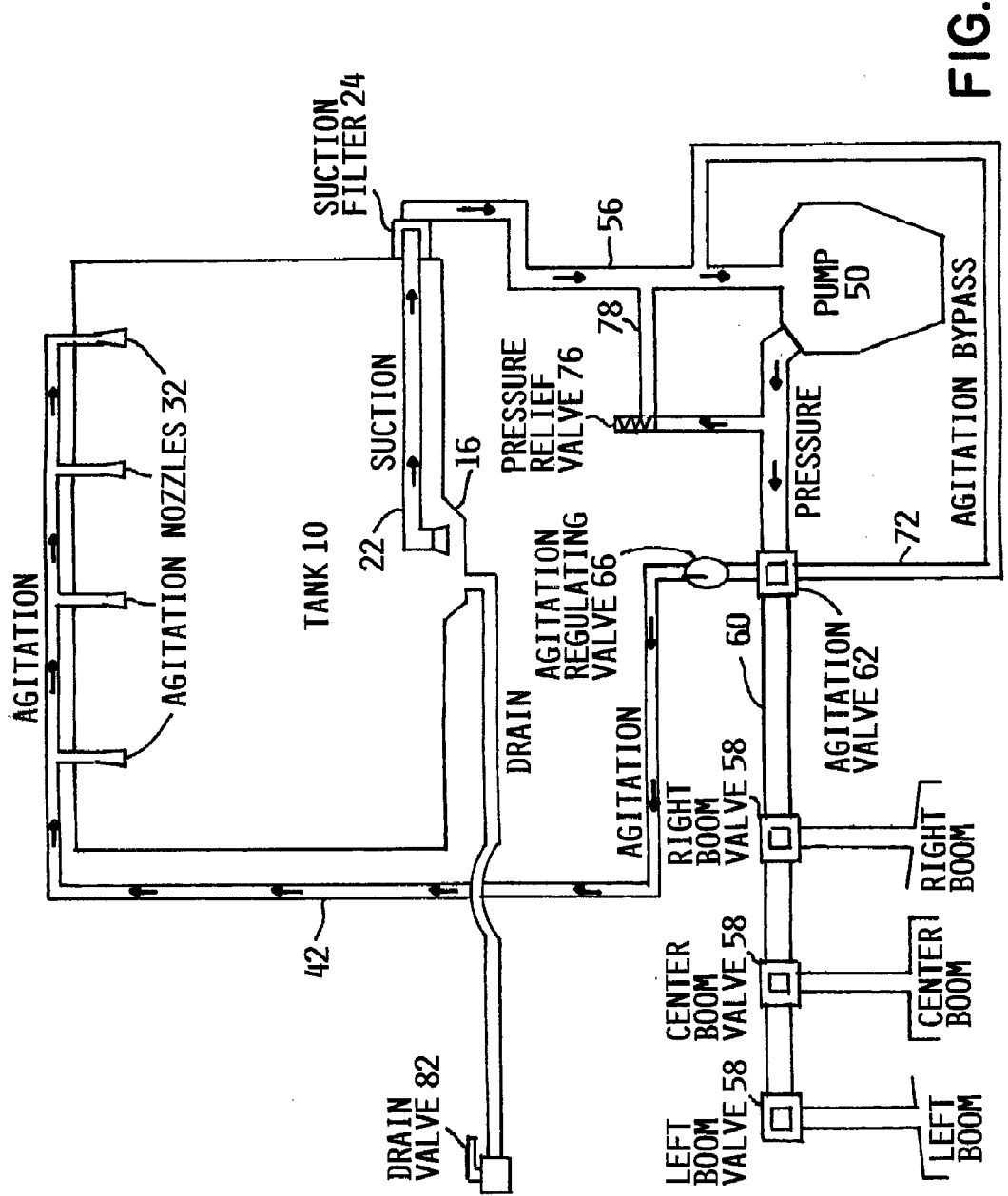
FIGS. 17a-17d are schematic flow diagrams which show fluid flow through the sprayer of FIG. 1 in various modes of operation of the spray and agitation systems of the sprayer.

With agitation turned on, an agitation only mode will occur when spray valves 58 that control flow to the spray booms are closed at the same time. In the agitation only mode, the spray solution in tank 10 will be continuously pulled out of tank 10, pass through spray pump 50, and then be sprayed back into tank 10 through agitation nozzles 32 in a closed loop fashion. The flow in the agitation only mode of operation is schematically depicted in FIG. 17*a*.

Figure 17B:
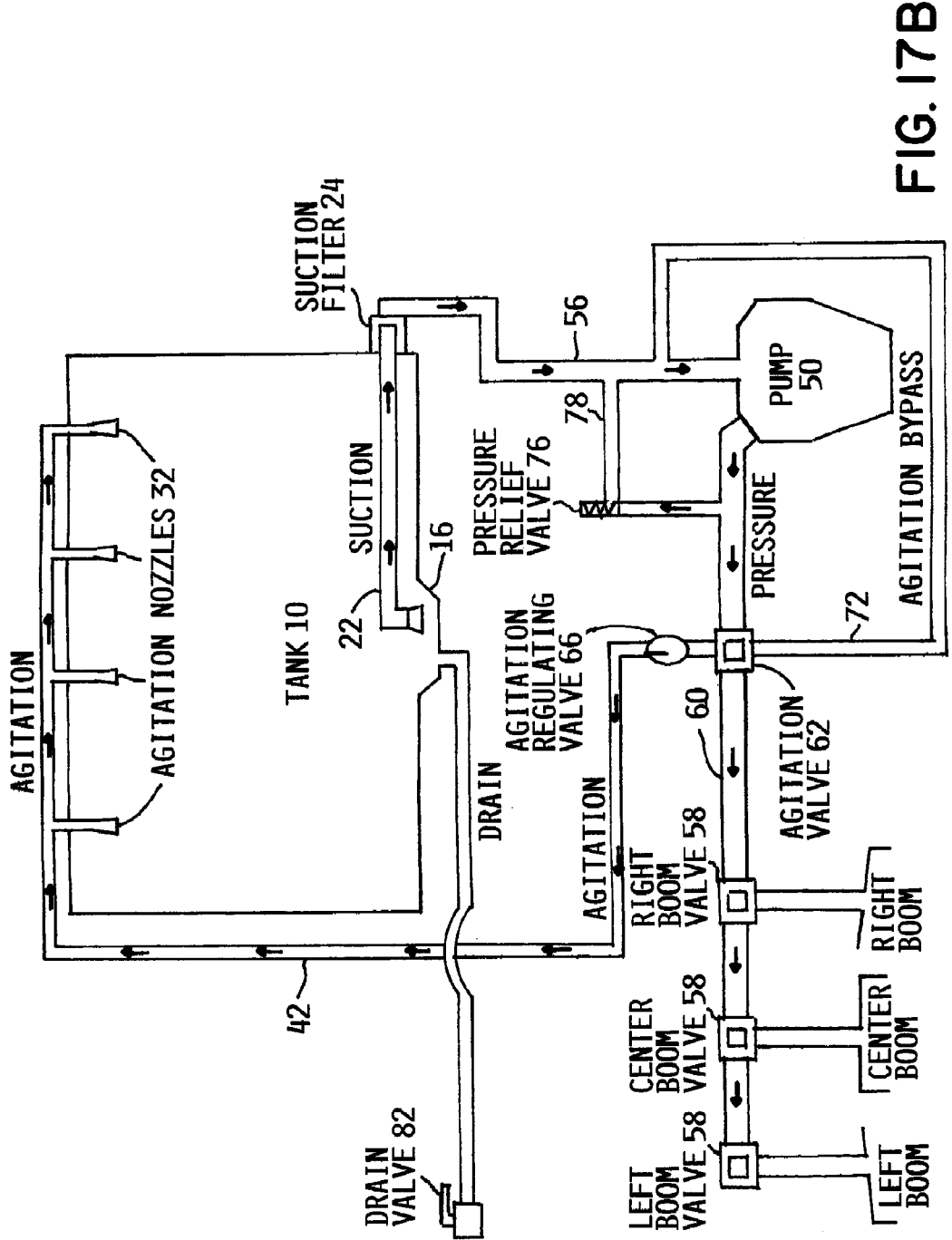

If agitation is both turned on and spray valves 58 are also open, then a combined agitation/spray mode will occur with a portion of the spray solution withdrawn from tank 10 passing through the open bottom outlet 64 of agitation valve 62 and the remainder of the spray solution passing outwardly through spray valves 58 and the spray booms. The flow in the combined agitation/spray mode of operation is schematically depicted in FIG. 17*b*.

Figure 17C:
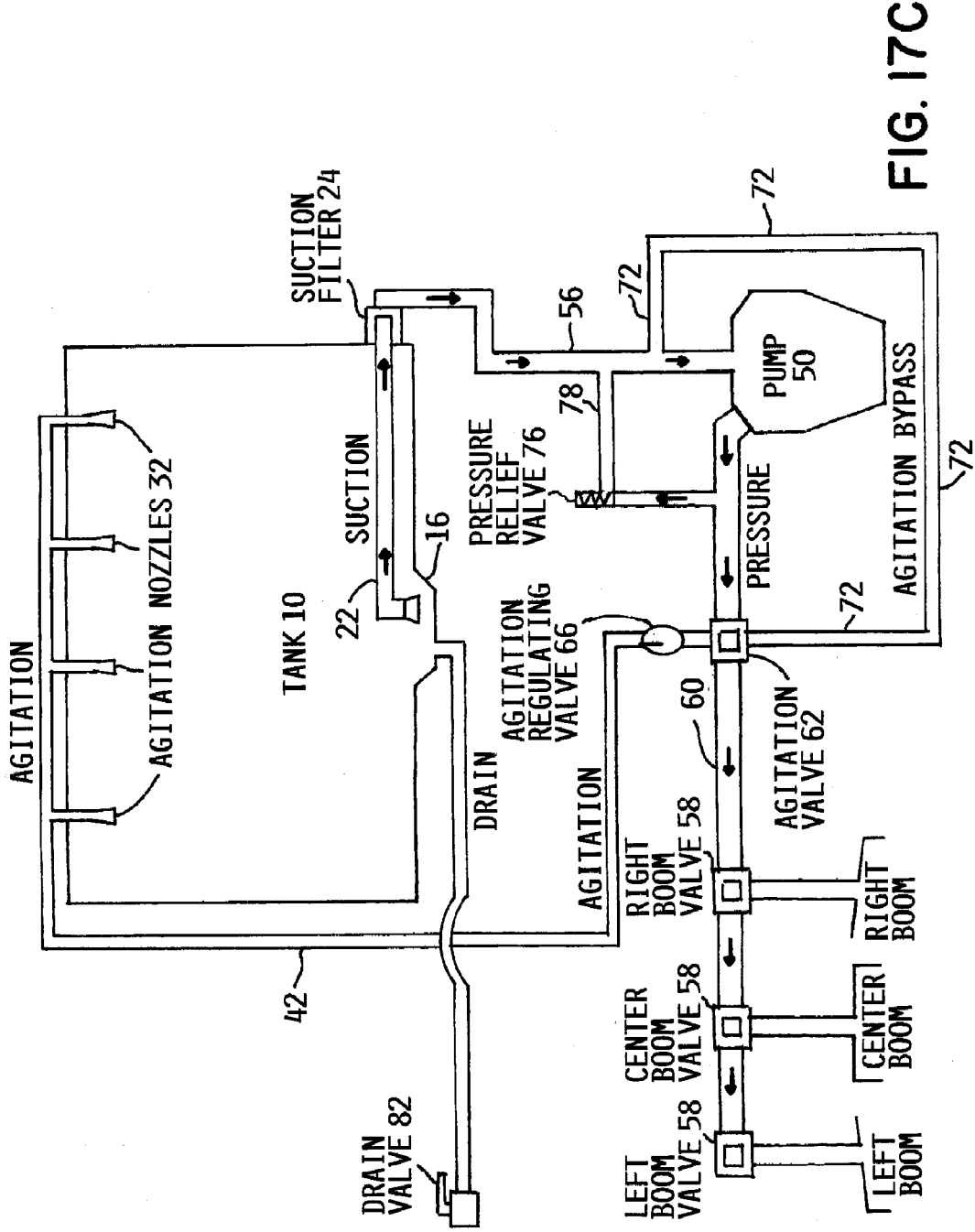

If agitation is turned off such that bottom outlet 64 of agitation valve 62 is closed but spray valves 58 are opened, then a spray only mode will occur in which the spray solution withdrawn from tank 10 is sprayed out through the spray booms in an open loop fashion. The flow in the spray only mode of operation is schematically depicted in FIG. 17*c*. The bypass flow described hereafter in conjunction with FIG. 17*d* will also occur in the spray only mode shown in FIG. 17*c* but has been omitted from the agitation bypass line in FIG. 17*c* for the sake of clarity.

As best shown in FIGS. 1 and 2, an additional manual agitation control valve 66 (i.e. a manually operable ball valve) is located in agitation hose run 42 to allow the user to adjust the amount of pressure in the flow to agitation nozzles 32. The agitation control valve 66 allows the flow in agitation hose run 42 to be additionally throttled from no flow to full flow.

Referring now to FIGS. 2 and 4, in addition to its bottom outlet 64, agitation valve 62 also has a side outlet 68 to which a bypass valve 70 is connected. A bypass hose run 72 connects the outlet of bypass valve 70 back to pump supply hose run 56. Flow into bypass valve 70 is shut off by agitation valve 62 when agitation is turned on. However, when agitation is turned off, side outlet 68 in agitation valve 62 is opened to permit at least some of the flow from spray pump 50 to pass through bypass valve 70, through bypass hose run 72, and back into pump supply hose run 56.

Figure 17D:
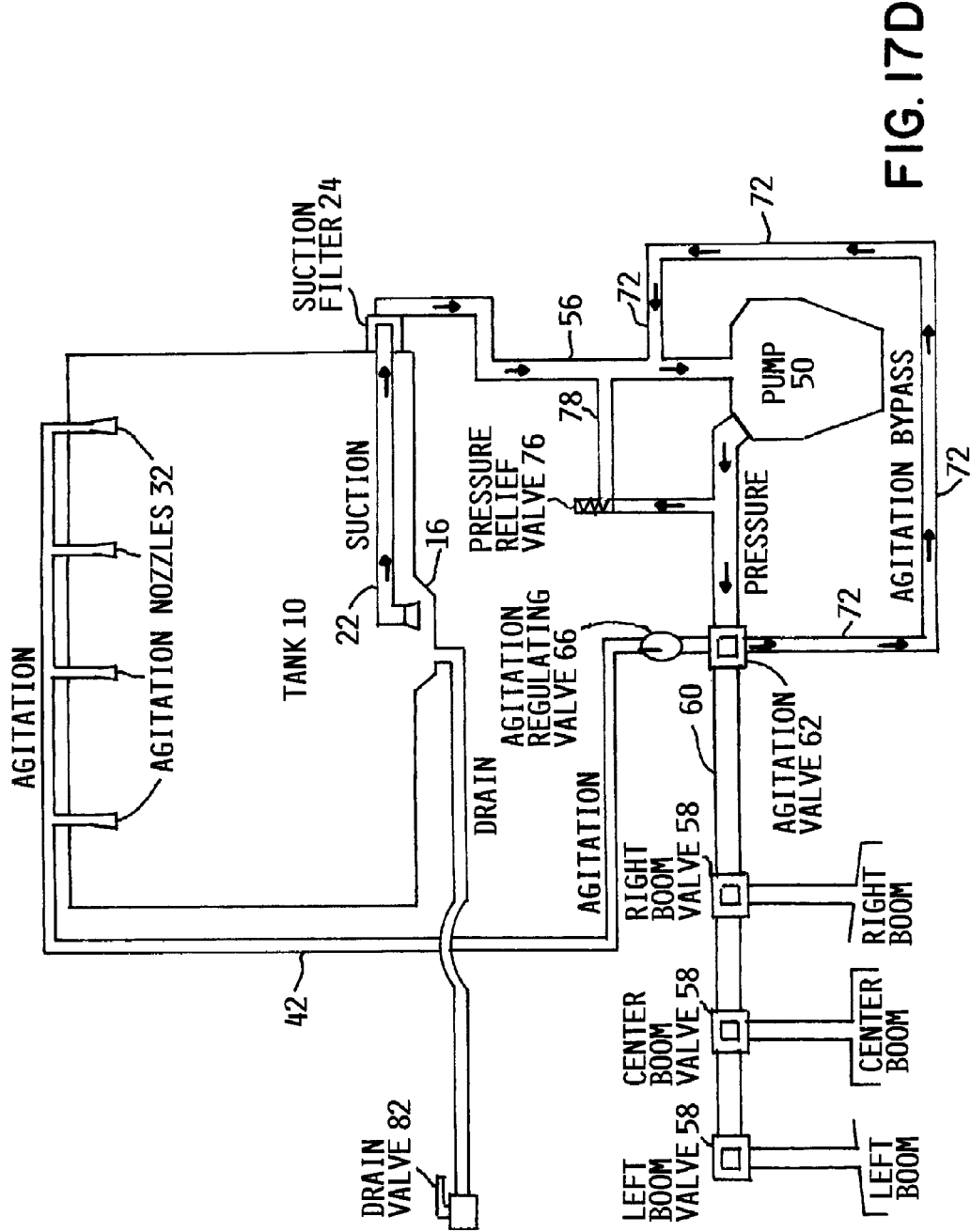

The amount of flow permitted through bypass valve 70 can be adjusted or calibrated using a manually operable adjustment knob 74 on bypass valve 70. Thus, if agitation is turned off but the engine and spray pump 50 are left running, bypass valve 70 ensures that some flow is constantly going back into the suction side of spray pump 50 through bypass valve 70 and bypass flow path 72 to ensure that spray pump 50 is never deadheaded, i.e. never builds up undue pressure from pump outlet 54 being closed to agitation. This bypass flow is schematically depicted in FIG. 17*d* (though bypass valve 70 is not itself shown in FIG. 17*c* as bypass valve 70 is mounted on side outlet 68 of agitation valve 72).

A pressure relief valve 76 is also operatively connected to spray hose run 60 leading from pump outlet 54 of spray pump 50. The outlet of pressure relief valve 76 is connected by a pressure relief hose run 78 back to pump supply hose run 56. Thus, if an abnormal and excessively high pressure should occur for some reason in the plumbing in the described system, particularly when bypass valve 70 is not effective because agitation is turned on, this excess pressure will be released by pressure relief valve 76 by opening another bypass path back into pump supply hose run 56 through pressure relief hose run 78. If pressure relief valve 76 ever opens, then a flow arrow will appear in pressure relief hose run 78 depicted in the schematic views of FIGS. 17*a*-17*d*.

Finally, drain opening 18 of tank 10 is connected by a drain hose run 80 to a manually operable on/off drain valve 82 carried on the bottom of spray pump 50. See FIGS. 3 and 5. However, drain valve 82 is located on spray pump 50 only as a matter of convenience. As an alternative, drain valve 82 could be placed elsewhere on frame 4 at some location other than spray pump 50. When the user opens drain valve 82 through manipulation of the control handle thereon, any remaining spray solution in tank 10 will drain from tank 10 through drain hose run 80 and drain valve 82. Drain valve 82 will normally be used to empty tank 10 of any remaining spray solution at the completion of a day's spraying operations.

The Rinse System

Sprayer 2 also includes a rinse system for cleaning or rinsing tank 10, spray pump 50, and the various hose runs associated therewith at the completion of spraying operations. Before beginning such rinsing, tank 10 is first drained of any remaining quantity of liquid spray solution left in tank 10 using drain valve 82.

Referring to FIGS. 1-4, a part of the rinse system comprises a rinse tank 84 for holding a much smaller volume of a rinse liquid (e.g. clean water) than the volume of spray solution held within tank 10, e.g. 30 gallons in rinse tank 84 compared to 300 gallons in tank 10. Rinse tank 84 has a lateral cross-sectional shape that is substantially the same as the lateral cross-section shape of tank 10. Rinse tank 84 is arranged in an abutting tandem relationship to tank 10 such that the two tanks 10 and 84 together appear to be one tank in FIG. 1. But, the fore-and-aft length $l_1$ of tank 10 is much larger than the fore-and-aft length $l_2$ of rinse tank 84 as shown in FIG. 3.

The length $l_2$ of rinse tank 84 is too short to accommodate an encircling strap 12 such as used with respect to tank 10. Instead, rinse tank 84 is secured in some other fashion either to frame 4 or to tank 10 or to both. As shown in FIG. 4, rinse tank 84 can be strapped to frame 4 by two top hold down straps 85 that extend between rear strap 12 on tank 10 and a frame attached bracket 86 that carries spray valves 58 and agitation valve 62.

Referring to the top view of FIG. 2, tank 10 has a front wall 9*f* that has a slightly concave shape from side to side and from top to bottom. Rinse tank 84 has a rear wall 83*r* with a matching concave shape so that the front and rear ends of the two tanks 10 and 84 together in their tandem relationship appear identical in shape to one another.

Use of the rinse system, and thus use of rinse tank 84, is an option and the rinse system and rinse tank 84 could be deleted if so desired. In such a case, the rear wall 9*r* of tank 10 also has the same matching concave shape as front wall 9*f* of tank 10 but nests inside a matching convex shape on front wall 83*f* of rinse tank 84. If the rinse system and rinse tank 84 are not used and are removed, the front and rear ends of tank 10 will look identical to the appearance they had when tank 10 was nested with rinse tank 84 since concave rear wall 9r of tank 10 will now be visible instead of concave rear wall 83r of rinse tank 84. The major difference is simply that tank 10 will be shorter since the length $l_2$ of rinse tank 84 will be missing. Thus, sprayer 2 has a consistent tank profile and appearance at its front and rear ends whether tank 10 alone is used or both tanks 10 and 84 are used.

As shown in FIG. 4, rinse tank 84 has a top inlet 87 that is closed by a cap 88 which may be removed to allow the rinse liquid to be introduced into rinse tank 84 through top inlet 87 using a hose (not shown) connected to a rinse liquid source (e.g. a tap or spigot connected to clean water). As shown in FIG. 3, rinse tank 84 also has a bottom outlet 90 for drawing the rinse liquid out of rinse tank 84.

The rinse system also includes a rinse pump 92 that is carried on frame 4. See FIG. 4. Rinse pump 92 has an inlet that is connected to bottom outlet 90 of rinse tank 84 using a rinse pump supply hose run 94. Rinse pump 92 has an outlet that is connected by a rinse hose run 96 to a pair of rinse nozzles 98 carried inside tank 10. As shown in the top view of FIG. 2, rinse hose run 96 includes a pair of branches 97 overlying the top of tank 10. One branch 97 supplies a rinse nozzle 98 installed in the top of tank 10 near the front of tank 10 and the other branch 97 supplies the other rinse nozzle 98 installed in the top of tank 10 near the rear of tank 10.

Rinse pump 92 is preferably an electrical pump and is wired into the electrical system of utility vehicle 8 to receive electrical power therefrom. However, other types of pumps, such as pumps that are hydraulically driven (as in spray pump 50), could be used in place of an electrical pump Referring now to FIGS. 8 and 9, each rinse nozzle 98 comprises a nozzle body 100 that extends a short distance downwardly from a fitting 102 mounted in the top of tank 10 on the ceiling 104 of tank 10. Nozzle body 100 has a conical lower end provided with a plurality of downwardly facing, circumferentially spaced, bottom nozzle ports 106 that extend around the conical lower end of nozzle body 100. A rotatable wheel or spinner 108 is provided on nozzle body 100 below bottom nozzle ports 106. Spinner 108 has a plurality of wings 110 that are slightly tilted or inclined relative to a horizontal plane. Wings 110 are provided with more steeply upwardly angled vanes 112.

As the rinse liquid is sprayed through bottom nozzle ports 106, the rinse liquid will hit wings 110 of spinner 108 and interact with wings 110 and vanes 112 to cause spinner 108 to rotate relative to nozzle body 100 at a relatively high rate of rotation. This causes the downwardly directed flow of rinse liquid from nozzle body 100 to be thrown substantially radially outwardly from nozzle body 100 in a somewhat umbrella shaped flow denoted generally by the arrows X in FIG. 8. Such an umbrella shaped flow better reaches and rinses the various front, rear and sidewalls of tank 10 and much of ceiling 104 of tank 10.

Preferably, wings 110 do not overlap with one another, but instead are circumferentially spaced apart from one another by a plurality of radially extending gaps 111 as best shown in FIG. 9. As spinner 108 rotates, gaps 111 periodically align with bottom nozzle ports 106 to allow flow from such nozzle ports 106 to temporarily be directed substantially vertically downwardly as depicted by the arrows Z in FIG. 8. This downwardly directed flow Z will better reach and rinse those areas of floor 11 of tank 10 that lie beneath rinse nozzles 98, i.e. to reach areas of floor 11 that might otherwise be missed by the more radially directed, umbrella shaped flow X.

In addition, rinse nozzles 98, without more, will not reach a doughnut shaped area on ceiling 104 of tank 10 immediately above nozzle body 100. To reach and rinse this awkwardly located area, nozzle body 100 is also provided with an annular, upwardly facing shoulder 114 therein. As shown in FIG. 9, four upwardly facing, circumferentially spaced, upper nozzle ports 116 are provided in shoulder 114, though there could be a different number of such upper nozzle ports 116 in shoulder 114. Each such upper nozzle port 116 is connected to a supply opening 118 therefor that is located in an open interior bore 120 of nozzle body 100.

Thus, as the rinse liquid flows down through interior bore 120 of nozzle body 100, much of this flow leaves nozzle body 100 through bottom nozzle ports 106. However, a portion of the flow gets directed through supply openings 118 and then upwardly through supply passages (not shown) that are drilled into nozzle body 100 to eventually exit through upper nozzle ports 116 in an upwardly directed flow indicated by the arrows Y in FIG. 8. This portion of the flow of the rinse liquid is sprayed directly onto the doughnut shaped area above nozzle body 100 to thoroughly wet and rinse such area as well. Thus, rinse nozzles 98 are configured to more fully reach and rinse all the interior surfaces of tank 10.

The rinse system described above is preferably operated in three rinse cycles in which approximately one third of the rinse liquid originally contained in rinse tank 84 is used. At the conclusion of each rinse cycle, spray pump 50 is then operated to withdraw the rinsate (the rinse liquid and the residual chemicals which the rinse liquid has cleaned from tank 10 in that rinse cycle) from tank 10 and to pump such rinsate out through the spray booms using the combined agitation/spray mode of operation until the rinsate has been emptied from tank 10. As noted, the rinse cycle and following spray pump operation is repeated three times, with the rinsate becoming cleaner each time. At the conclusion of all of these various rinse and spray pump cycles, the tank 10, spray pump 50, agitation nozzles 32, the spray nozzles on the spray booms, and the plumbing associated with the spray and agitation systems will be substantially cleaned of any residual spray solution.

Figure 18:
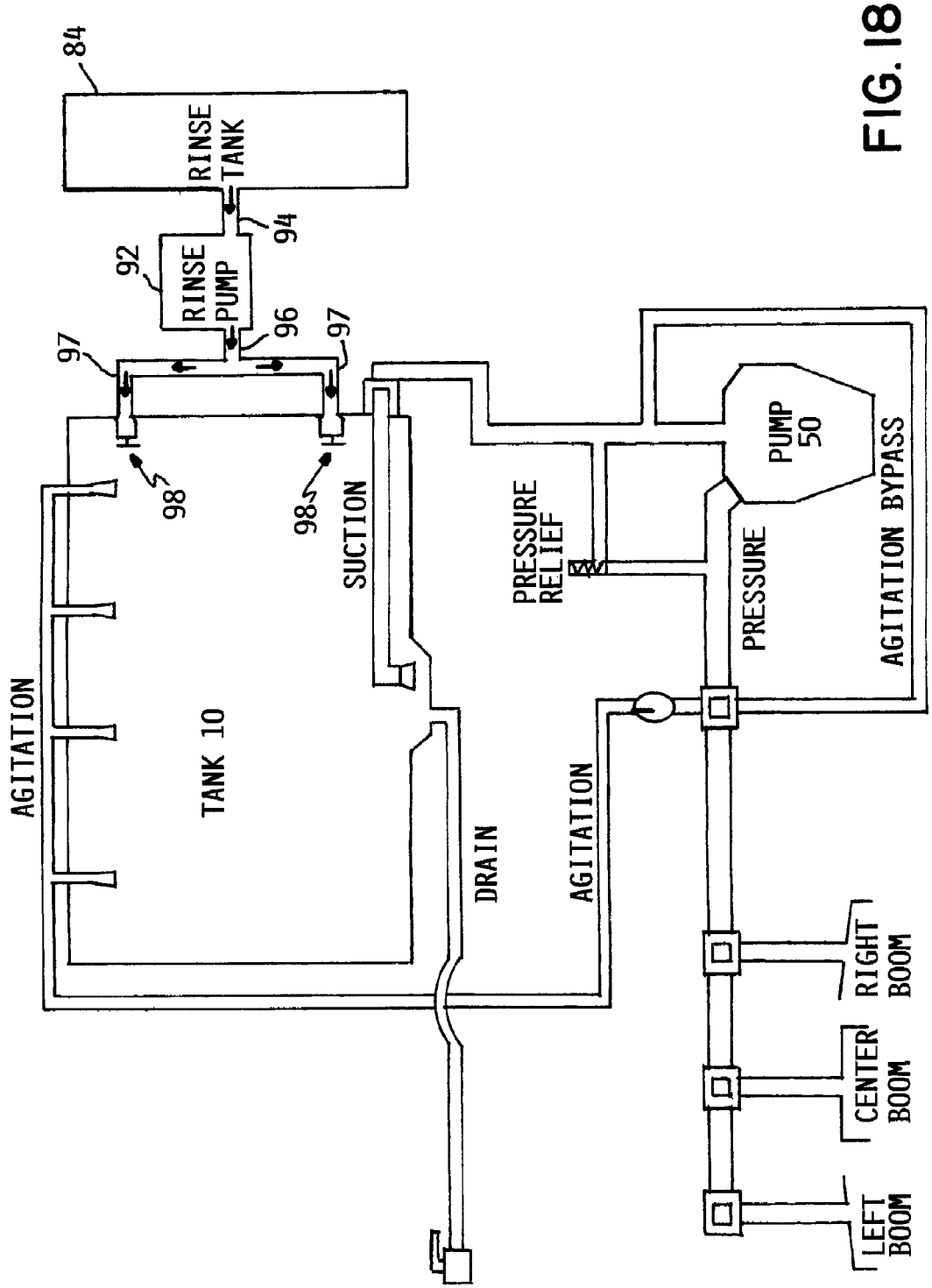
FIG. 18 is a schematic flow diagram similar to FIGS. 17a-17d, but showing fluid flow through the sprayer during operation of an optional rinse system of the sprayer.

FIG. 18 is a schematic view showing the flow into tank 10 during operation of the rinse system. In FIG. 18, rinse nozzles 98 are shown in a plane that is perpendicular to their actual orientation in tank 10 only because FIG. 18 is a two-dimensional view. In actuality, rinse nozzles 98 extend downwardly into the very top of tank 10 hanging down from fittings 102 carried in ceiling 104 of tank 10.

The rinse system described above has various desirable characteristics. It allows tank 10 to be rinsed and cleaned of residual spray solution without requiring manual labor on the part of the user to manually hose the interior of tank 10 and without exposing the user directly to the residual spray solutions in tank 10. In addition, the use of an onboard rinse system allows the cleaning and rinsing of tank 10 to be done more efficiently without the need for back and forth transport to allow clean water to be introduced into tank 10 at one location with subsequent transport required to a location where the rinsate can be safely emptied in an environmental sense from tank 10. Normally, most places where the spray solution can be applied, such as the turf areas of a golf course, are also areas onto which the rinsate can be emptied. Thus, the user can often perform the repeating rinse and spray pump cycles of operation at the same locations where he or she has been spraying, thus saving considerable inconvenience and time.

In addition, the components of the rinse system, including the use of a separate rinse pump 92, are entirely segregated from the plumbing components, including spray pump 50, that handle the spray solution. Thus, there is never a possibility that the clean water contained in rinse tank 84 will be contaminated or polluted in any way with any residual chemicals prior to the rinse liquid being sprayed by rinse nozzles 98 into tank 10. This enhances the cleaning ability of the rinse system and ensures that it does not itself become contaminated.

The Eductor System

Sprayer 2 of this invention also optionally comprises a chemical eductor 122 that can be used to initially mix the chemicals with water previously placed into tank 10 to form the spray solution. Chemical eductors are well known components used for this purpose. Eductor 122 shown herein is one known as the Hypro Cleanload Chemical Eductor (Model 3375P) manufactured and sold by Hypro LLC, New Brighton, Minn.

Figures 13, 14:
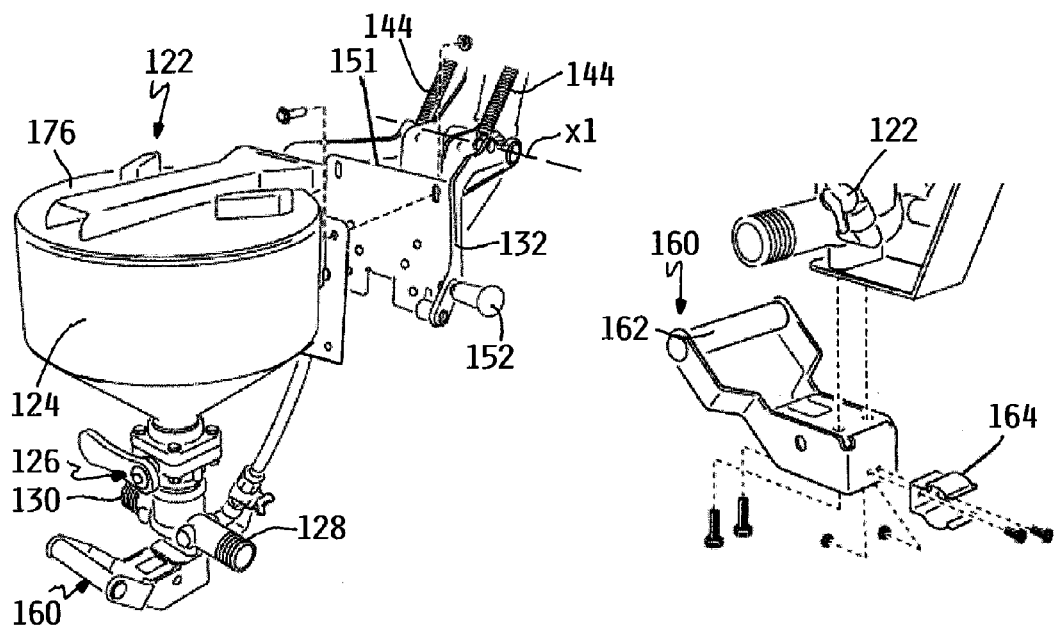
FIG. 13 is a perspective view of the eductor prior to its being joined to the pivotal cradle, particularly illustrating the cradle in a lower fill and operational position.
FIG. 14 is a perspective view of the handle that is attached to the bottom of the eductor, particularly illustrating the spring clamp on the handle.

By way of background only and referring to FIGS. 10 and 13, eductor 122 comprises a hopper 124 for containing a quantity of wet or dry chemicals, a bottom valve block 126 having a fluid inlet 128 and a fluid outlet 130, and a venturi nozzle (not shown) within valve block 126 for metering chemicals into a water stream passing between fluid inlet 128 and fluid outlet 130 to mix the chemicals with water to form a spray solution. This invention is not concerned with the structure of eductor 122, but rather how eductor 122 is mounted and carried on tank 10 for movement between a lower fill and operating position (shown in FIG. 13) and an upper storage and transport position (shown in FIGS. 10 and 16.

Figure 11:
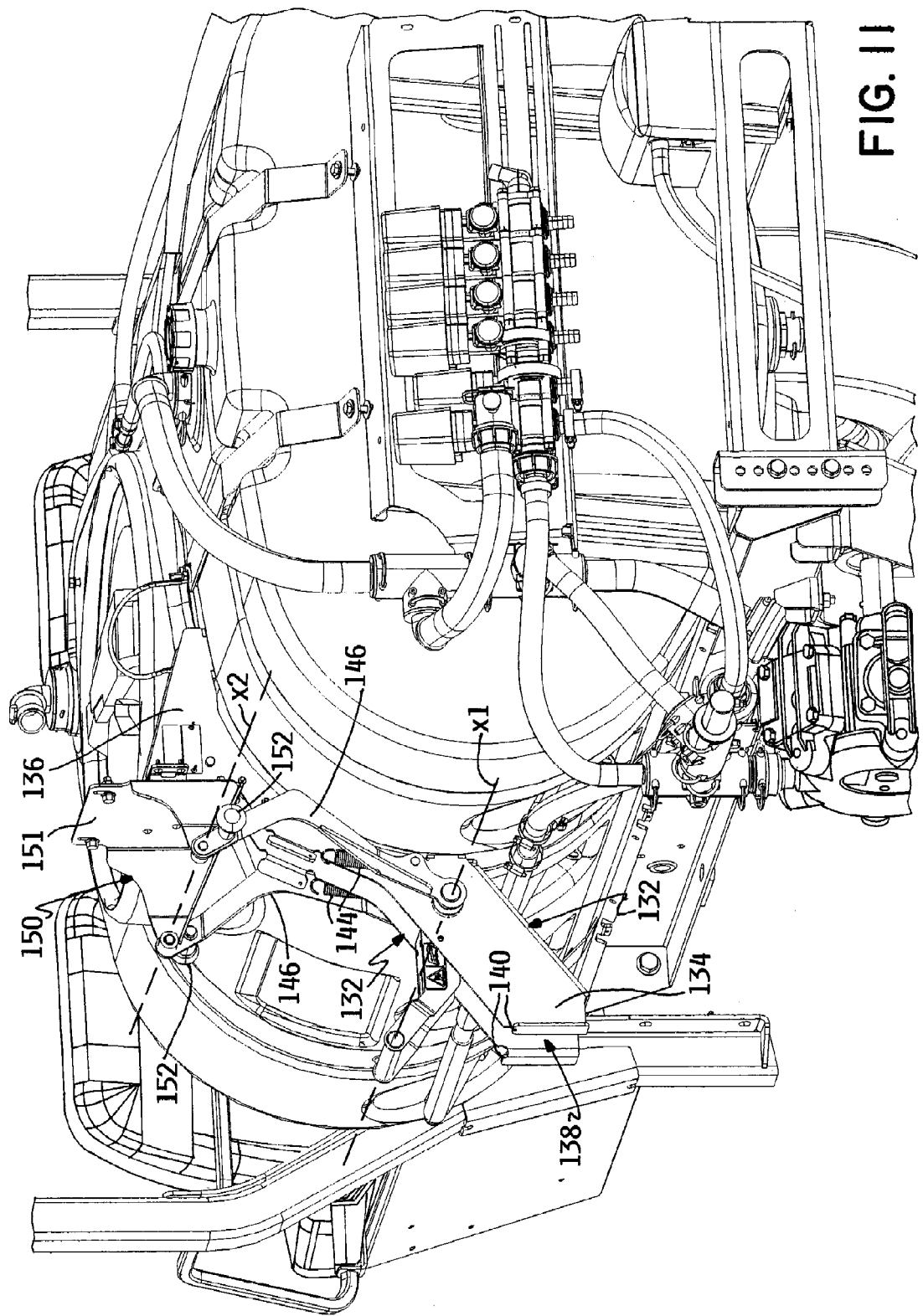
FIG. 11 is a rear perspective view similar to FIG. 10, but with the eductor having been removed to more particularly illustrate the cradle that is pivotally mounted on a pair of mounting brackets on the side of the holding tank by a pair of mounting arms and with the cradle serving to pivotally mount the eductor relative to the mounting arms.
Figure 12:
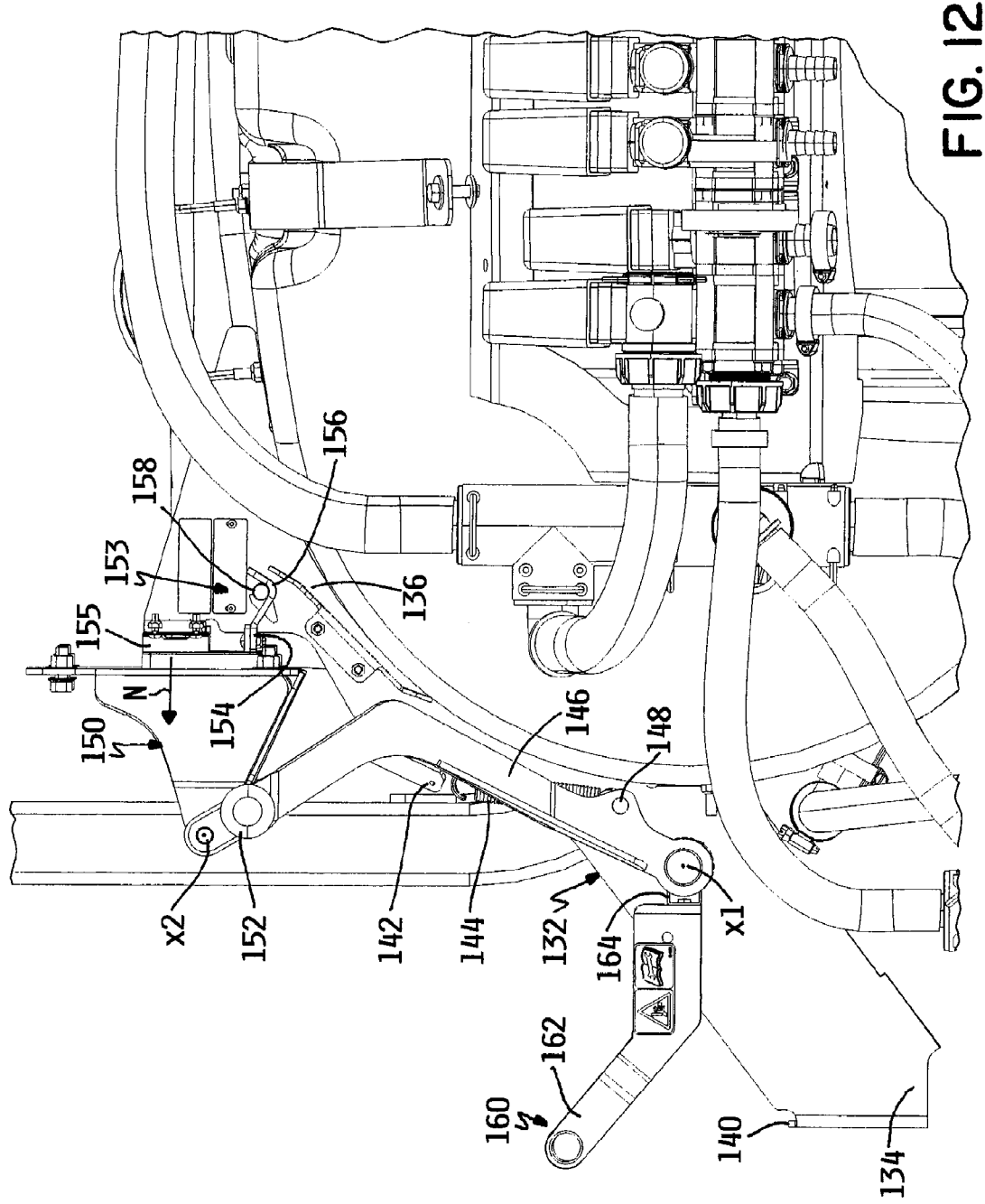
FIG. 12 is a side elevational view of the eductor mounting structure shown in FIG. 11, particularly illustrating the structure with one of the mounting brackets having been removed to show the releasable catch between the pivotal cradle and the tank.

When sprayer 2 is equipped with eductor 122, the eductor 122 is mounted to one side of tank 10 on a pair of substantially identical brackets 132 that are fastened in any suitable manner to the side of tank 10. Referring to FIGS. 11 and 12, each bracket 132 comprises a vertically extending flange having a lower end 134 that protrudes outwardly from a lower side of tank 10 and an upper end 136 that matches the curvature of the upper half or so of tank 10. Brackets 132 are spaced a short distance apart from one another to define a relatively narrow channel 138 therebetween. Lower end 134 of each bracket 132 contains a stop 140 that protrudes to one side of bracket 132. In addition, each bracket 132 has a tab with a hole 142 that is used as a fixed attachment point for one end of a biasing spring 144. Note that in FIGS. 11 and 12 the springs 144 are shown out of holes 142 for the sake of clarity.

Referring further to FIGS. 11 and 12, two substantially identical mounting arms 146 are pivotally attached to brackets 132 for rotation about a substantially horizontal pivot axis $x_1$. As best shown in FIG. 11, each arm 146 is adjacent and outboard of one bracket 132. As shown in FIG. 12, the lower end of each spring 144 is attached to a connecting pin 148 that is carried on each arm 146 relatively close to the pivot axis $x_1$. Arms 146 have upper ends that carry a U-shaped mounting cradle 150. Hopper 124 of eductor 122 is bolted to cradle 150 with at least a portion of hopper 124 being received within cradle 150.

However, cradle 150 is not rigidly affixed to the upper ends of arms 146, but is pivotally connected thereto to be able to rotate or pivot about a second substantially horizontal pivot axis $x_2$. See FIGS. 11 and 12. Thus, arms 146 can rotate about the axis $x_1$ relative to brackets 132 while cradle 150 that holds eductor 122 can further rotate about the axis $x_2$ relative to arms 146. Each arm 146 includes an outwardly protruding knob 152 allowing the user to grip and apply force to cradle 150 when moving eductor 122 between its various positions.

Referring further to FIG. 12, cradle 150 which holds eductor 122 has a releasable catch 153 formed in part by a rearwardly protruding tang 154 on a rear wall 151 of cradle 150 which tang 154 points inwardly towards tank 10. Tang 154 has an upwardly facing notch 156. A fixed horizontal rod 158 is carried in channel 138 between brackets 132. Rod 158 is positioned to interact with tang 154 such that notch 156 in tang 154 can be manipulated beneath rod 158 until rod 158 is received in notch 156. Thus, notch 156 in tang 154 together with rod 158 form catch 153 which when engaged holds cradle 150 that mounts eductor 122 up against the side of tank 10. FIG. 12 shows catch 153 in an engaged position.

Figure 21:
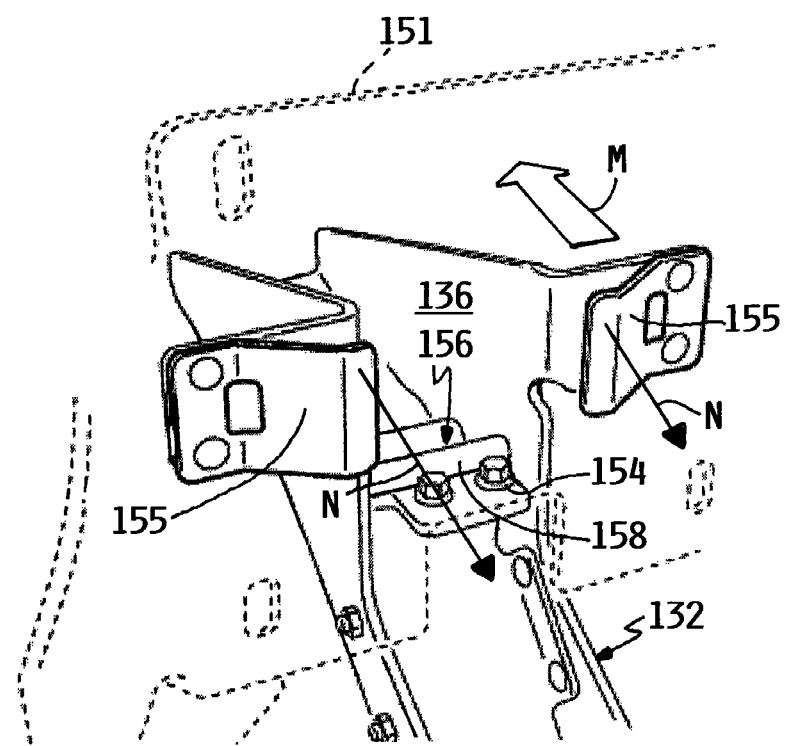
FIG. 21 is a perspective view of a portion of the eductor mounting structure shown in FIGS. 10-16, particularly illustrating a pair of flexible spring tabs that ensure a snug engagement of an upper catch that is part of the eductor mounting structure.

It is desirable that catch 153 when engaged be snug to prevent rattling and the like and to firmly hold eductor 122 in position. As shown in FIG. 21, the upper end 136 of each bracket 132 includes an outwardly protruding flexible spring tab 155. When rear wall 151 of cradle 150, which is shown in phantom in FIG. 21, is pressed towards the upper ends 136 of brackets 132 in the direction of arrow M, rear wall 151 presses against both spring tabs 155 to compress or deflect spring tabs 155 about halfway towards full deflection. Such deflection causes spring tabs 155 to apply an outward counterforce, indicated by arrow N in FIG. 21, that tends to keep notch 156 in tank 154 firmly pressed up against the rear of rod 158 to form a snug and rattle free engagement. Such counterforce N has a further desirable characteristic in that it helps keep a lower spring clamp 164 firmly engaged as will be described hereafter.

Referring now to FIGS. 13 and 14, a handle 160 having a U-shaped grip 162 is bolted or otherwise fixed to the bottom of eductor 122. Handle 160 is equipped with a U-shaped spring clamp 164 that faces inwardly towards tank 10. Spring clamp 164 is adapted for clamping against a bushing or sleeve 166 that is contained in channel 138 between brackets 132. See FIG. 15. Sleeve 166 is located on the pivot axis $x_1$.

Referring now to FIG. 10, fluid inlet 128 on eductor 122 is coupled by an eductor inlet hose run 168 to an eductor valve 170. Eductor valve 170 is interposed into spray hose run 60 between agitation valve 62 and spray valves 58. Fluid outlet 130 of eductor 122 is coupled by an eductor outlet hose run 172 to a second fill opening 174 that is placed into the top of tank 10.

Figure 19:
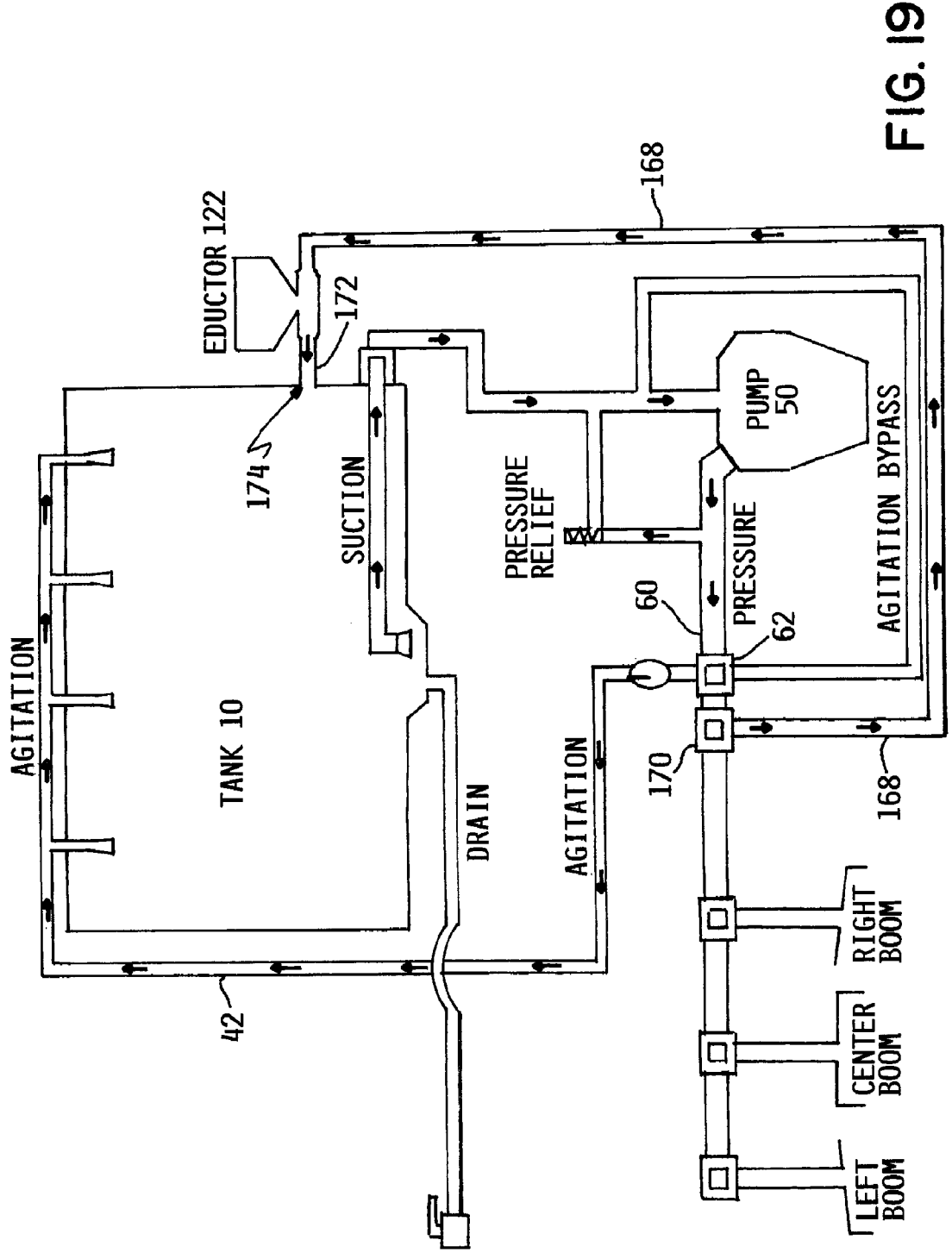
FIG. 19 is a schematic flow diagram similar to FIG. 17, but showing fluid flow through the sprayer during operation of an optional chemical and water mixing eduction system of the sprayer.

In using eductor 122, tank 10 is filled with water through fill opening 13 and hopper 124 of eductor 122 is filled separately with the desired chemicals (herbicides or pesticides or some combination thereof) that are to be mixed with this water. Spray pump 50 is then placed into operation while agitation valve 62 and eductor valve 170 are both opened but spray valves 58 remain closed. In this situation, water will be drawn by spray pump 50 out of tank 10 with some of this water being used for agitation in tank 10 but with some of this water being directed by the open eductor valve 170 through eductor 122 to mix the chemicals held within hopper 124 of eductor 122 and the water together. This mixture forms the spray solution and travels through eductor outlet hose run 172 and through fill opening 174 into tank 10. FIG. 19 is a schematic view showing the flow into tank 10 during the operation of eductor 122 as just described. This operation is allowed to continue until all the chemicals held within hopper 124 have been metered into the flow passing through eductor 122.

Figure 20:
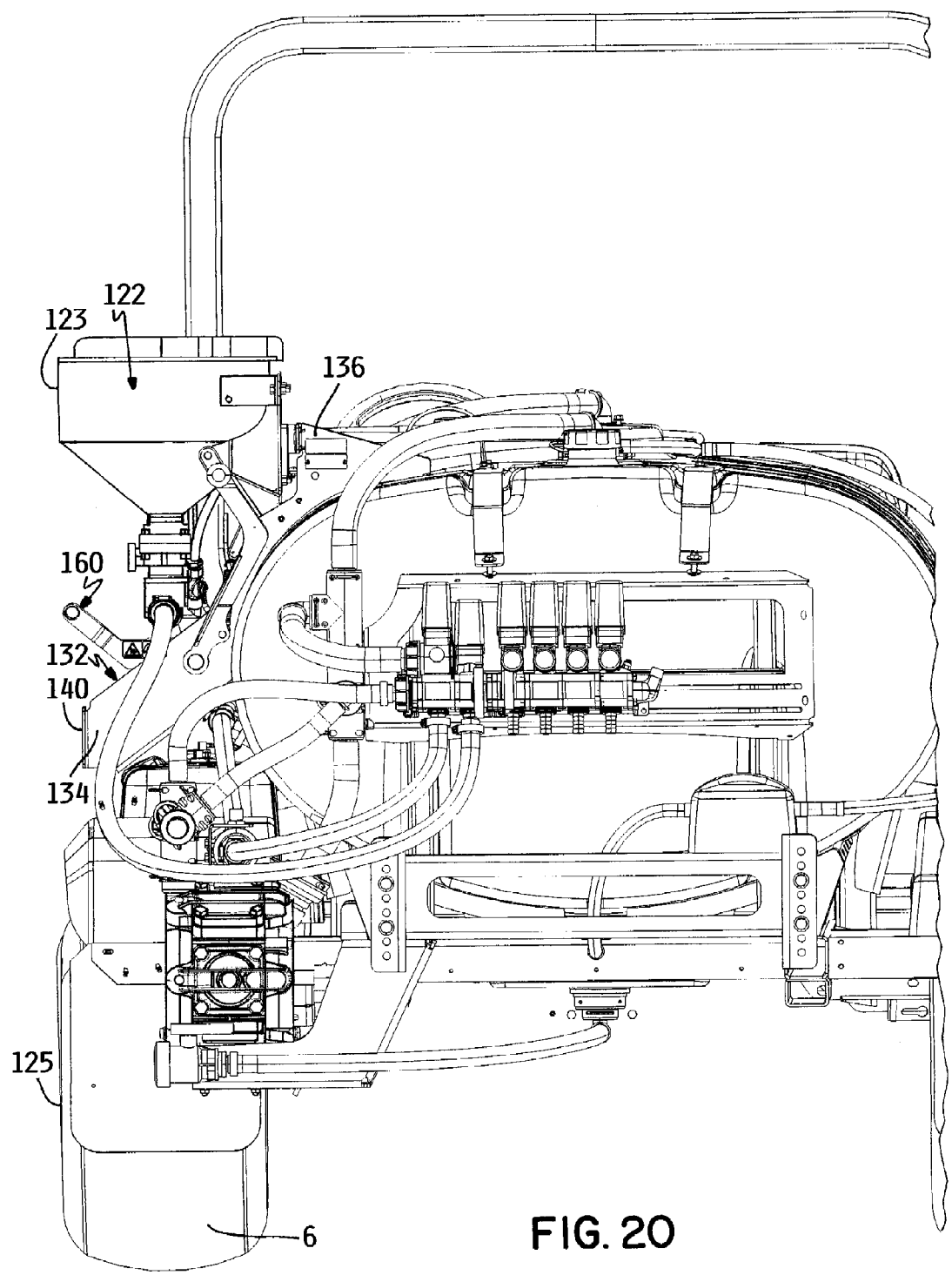
FIG. 20 is a rear elevational view of a portion of the sprayer of FIG. 1, particularly illustrating the eductor shown in FIGS. 10-16 disposed in its upper storage and transport position with the eductor and the eductor mounting structure being located inboard of the ground engaging wheels carried on that side of the sprayer to which the eductor is mounted.

FIGS. 10 and 20 illustrate eductor 122 in a non-operative storage and transport position contained on the side of tank 10 but very near the top of tank 10. In this position, the laterally outermost portion of eductor 122, namely the laterally outermost point 123 of hopper 124 of eductor 122, does not extend substantially laterally outwardly of the lateral wheelbase of frame 4 of sprayer 2. This is also true for the structure that mounts eductor 122 to the side of tank 10. In other words, all of the mounting structure for eductor 122 and eductor 122 do not extend laterally beyond or outboard of, and are preferably slightly inboard of, the laterally outermost tire edge 125 of the ground engaging wheels 6 on the side of sprayer 2 which carries eductor 122.

This allows sprayer 2 to be transported without fear of contact between eductor 122 and any of its mounting structure with external obstacles. If sprayer 2 misses such obstacles, so too will eductor 122 by virtue of the inboard position of eductor 122 relative to the lateral wheelbase of sprayer in the upper storage and transport position of eductor 122. However, in this upper position, eductor 122 is too high above the ground for a user who is standing on the ground to reach and load with chemicals.

FIG. 13 shows eductor 122 in a lower fill and operational position with eductor 122 having been exploded away from arms 146. In this lower fill and operational position, a lid 176 on the top of hopper 124 of eductor 122 is located close enough to the ground to be easily accessible to a standing user, i.e. lid 176 of eductor 122 is at belt level of the user or slightly higher. Thus, the user can remove lid 176 and easily pour dry or liquid chemicals into hopper 124. The lower fill and operational position will also be the position in which eductor 122 would be operated to mix the chemicals with the water as described earlier.

In the lower fill and operational position, arms 146 are swung forwardly and downwardly about the pivot axis $x_1$. Portions of arms 146 now rest or abut against the tops of stops 140 on brackets 132 to support and hold eductor 122 in its lower fill and operational position. In this position, springs 144 have been further tensioned with such springs serving to counterbalance most of the weight of eductor 122.

Figures 15, 16:
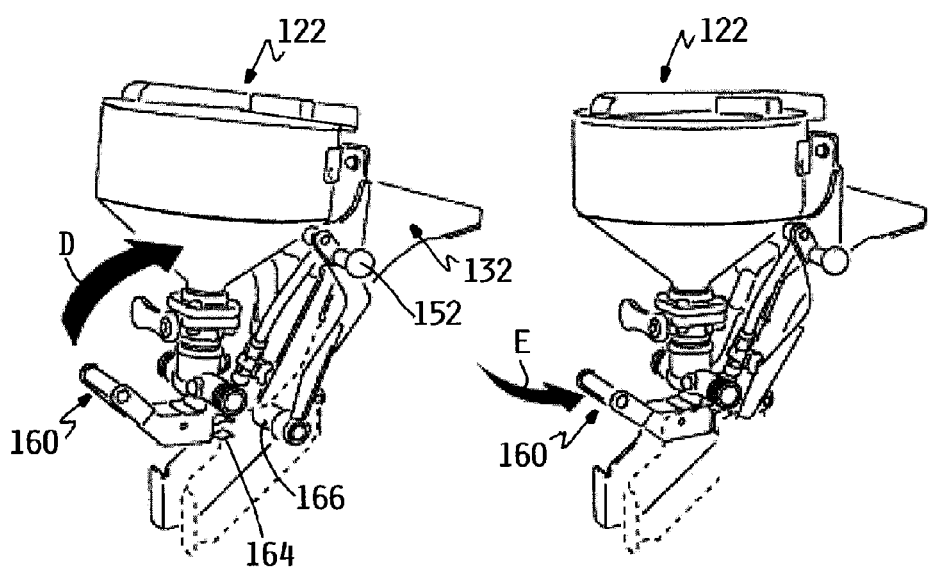
FIGS. 15 and 16 are diagrammatic perspective views of the eductor, particularly illustrating the steps of pivoting the eductor upwardly and placing the eductor into its upper storage and transport position on the spray solution holding tank.

To move eductor 122 between its lower fill and operational position as shown in FIG. 13 and its upper storage and transport position as shown in FIG. 16, the user grips one knob 152 with one hand and grips handle 160 with his or her other hand. The user then lifts upwardly on eductor 122 to begin to pivot arms 146 back upwardly around pivot axis $x_1$. This upward lifting action is indicated by the arrow D in FIG. 15.

During this upward lifting D, the user also uses differential force between knob 152 and handle 160 by pushing inwardly slightly on knob 152 and by pulling outwardly slightly as he or she lifts. Using such differential force, the user is able to rotate eductor 122 about pivot axis $x_2$ as arms 146 pivot about axis $x_1$ until eductor 122 is tipped slightly back towards tank 10 (i.e. does not a purely vertical orientation) as it approaches tank 10. This tipped orientation is shown in FIG. 15. This tipped orientation enables the user to engage catch 153 by letting the user angle tang 154 on the back of cradle 150 downwardly in such a way that he or she can position notch 156 in tang 154 to slip beneath rod 158 on brackets 132. In achieving this, spring tabs 155 get slightly compressed to assert the outward counterforce N that helps keep notch 156 firmly pressed up against rod 158.

Once catch 153 is engaged in this way, the user can then vertically straighten out eductor 122 (i.e. get rid of the tilt) by pushing inwardly on handle 160 to move handle 160 towards tank 10 as shown by the arrow E in FIG. 16. This inward push causes cradle 150 holding eductor 122 to become substantially horizontal as shown in FIG. 16. The inward push continues until spring clamp 164 on handle 160 engages over sleeve 166 contained in channel 138 between brackets 132. This engagement of spring clamp 164 releasably latches eductor 122 in its upper storage and transport position. Counterforce N from spring tabs 155 acts on the eductor mounting structure in a manner that tends to bias spring clamp 164 towards sleeve 166 to help keep spring clamp 164 engaged on sleeve 166.

To move eductor 122 back down to its lowered fill and operational position, the sequence of events in FIGS. 15 and 16 is reversed. First, the user unlatches handle 160 by pulling handle 160 outwardly to pull spring clamp 164 off sleeve 166. Then the user tips eductor 122 upwardly to cause tang 154 to release from rod 158 and then pulls eductor 122 downwardly until it is stopped in the position shown in FIG. 13 by stops 140. This mechanism provides easy and smooth movement of eductor 122 between the various positions thereof with much of the weight of eductor 122 being counterbalanced by springs 144.

Use of eductor 122 obviates the need for the user to manually pour the chemicals into the tank 10. Such a task would obviously require the user to get on top of tank 10 to reach fill opening 13 while carrying or holding a container that carries the chemicals. After removing lid 14, the user would then manually pour the chemicals into tank 10. This can be a physically strenuous task which exposes the user to a risk that he or she might accidentally spill some of the chemicals onto himself or herself. When using eductor 122 in its lower fill and operational position, the user can simply and much more easily pour the chemicals into hopper 124 of eductor while securely standing on the ground. While use of an eductor 122 is preferred for this reason, the entire eduction system described in this section of this patent application is optional and could be deleted from sprayer 2 if so desired.

Various modifications of this invention will be apparent to those skilled in the art. Thus, the scope of the invention shall be limited only by the appended claims.

The invention claimed is:

1. A sprayer for applying a liquid spray solution to a ground or turf surface, which comprises:
   (a) a frame that is movable over the ground or turf surface;
   (b) a tank carried by the frame for holding the liquid spray solution, the tank having a substantially elliptical lateral cross section that can be subdivided into a pair of upper quadrants and a pair of lower quadrants by an xy coordinate system that is centered on a longitudinal centerline of the tank;
   (c) a spray system carried by the frame for withdrawing the liquid spray solution from the tank and for spraying the liquid spray solution downwardly onto the ground or turf surface through a plurality of downwardly facing spray nozzles;
   (d) an agitation system carried by the frame for withdrawing the liquid spray solution from the tank and for recirculating the liquid spray solution back into the tank for keeping the liquid spray solution in solution, the agitation system comprising a plurality of agitation nozzles that are mounted on one side of the tank, that are spaced apart along a length of the tank, and that are oriented to direct the spray solution inwardly into the tank, and wherein the agitation nozzles are located within one of the lower quadrants of the tank lateral cross section; and
   (e) wherein the agitation nozzles are mounted at a height above a floor of the tank and eject the spray solution therefrom in a direction that is angled downwardly relative to the floor of the tank, and wherein the height of the nozzles above the floor of the tank and the downwardly angled direction of the spray solution emitted by the nozzles are chosen such that the spray solution emitted by the agitation nozzles intersects the floor of the tank at a location that does not extend beyond the longitudinal midline of the tank to promote a rolling action of the spray solution in the substantially elliptical shape of the tank.

2. The sprayer of claim 1, wherein the agitation nozzles are parallel to one another and eject the spray solution in substantially concentrated jets therefrom.

3. The sprayer of claim 1, wherein the agitation nozzles are mounted in plurality of inwardly extending, downwardly angled pockets placed in the one side of the tank with the pockets extending into the volume of the lower quadrant in which the agitation nozzles are mounted.

4. The sprayer of claim 3, wherein the agitation nozzles and the pockets in which they are mounted are arranged in a straight, substantially horizontal line as they extend along the length of the tank.

5. The sprayer of claim 3, wherein the pockets are open at the one side of the tank to allow the agitation nozzles to be installed in or removed from the pockets from outside the tank without needing access to the interior of the tank.

6. The sprayer of claim 5, wherein the nozzles can be installed in or removed from the pockets without needing tools.

7. The sprayer of claim 6, wherein each agitation nozzle has a mount that includes an annular slot that cooperates with a slidable U-shaped connector to releasably hold the agitation nozzles in the pockets, the U-shaped connector being slidable out of the slot in the mount to release each agitation nozzle from the pocket.

8. A sprayer for applying a liquid spray solution to a ground or turf surface, which comprises:

(a) a frame that is movable over the ground or turf surface;

(b) a tank carried by the frame for holding the liquid spray solution, the tank having a lateral cross section that can be subdivided into a pair of upper quadrants and a pair of lower quadrants by an xy coordinate system that is centered on a longitudinal centerline of the tank;

(c) a spray system carried by the frame for withdrawing the liquid spray solution from the tank and for spraying the liquid spray solution downwardly onto the ground or turf surface through a plurality of downwardly facing spray nozzles;

(d) an agitation system carried by the frame for withdrawing the liquid spray solution from the tank and for recirculating the liquid spray solution back into the tank for keeping the liquid spray solution in solution, the agitation system comprising a plurality of agitation nozzles that are mounted on one side of the tank, that are spaced apart along a length of the tank, and that are oriented to direct the spray solution inwardly into the tank, and wherein the agitation nozzles are located within one of the lower quadrants of the tank lateral cross section; and (e) wherein the agitation system comprises a pump for pumping the spray solution from the tank and through the agitation nozzles when an agitation valve is opened to permit such pumping action, and further including a bypass flow path extending between an outlet side of the pump and an inlet side of the pump which bypass flow path is closed when the agitation valve is opened but is open when the agitation valve is closed such that some spray solution is being recirculated between the outlet side of the pump and the inlet side of the pump to prevent deadheading of the pump when agitation is off.

\* \* \* \* \*